(12) United States Patent
Hashida

(10) Patent No.: US 8,821,618 B2
(45) Date of Patent: Sep. 2, 2014

(54) FABRICATION METHOD FOR GAS-ADSORBING DEVICE, GAS-ADSORBING DEVICE, AND METHOD OF USING THE SAME

(75) Inventor: Masamichi Hashida, Shiga (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 13/257,173

(22) PCT Filed: Mar. 23, 2010

(86) PCT No.: PCT/JP2010/002033
§ 371 (c)(1),
(2), (4) Date: Sep. 16, 2011

(87) PCT Pub. No.: WO2010/109846
PCT Pub. Date: Sep. 30, 2010

(65) Prior Publication Data
US 2012/0006195 A1     Jan. 12, 2012

(30) Foreign Application Priority Data

Mar. 24, 2009 (JP) .................................. 2009-071332
Nov. 2, 2009 (JP) .................................. 2009-251705
Feb. 9, 2010 (JP) .................................. 2010-026194

(51) Int. Cl.
| | | |
|---|---|---|
| *B01D 53/02* | (2006.01) | |
| *H01J 9/39* | (2006.01) | |
| *B01D 53/04* | (2006.01) | |
| *F16L 59/06* | (2006.01) | |
| *A47J 41/02* | (2006.01) | |
| *F17C 3/08* | (2006.01) | |

(52) U.S. Cl.
CPC .............. *B01D 53/0407* (2013.01); *H01J 9/39* (2013.01); *H01J 2211/52* (2013.01); *F16L 59/06* (2013.01); *A47J 41/028* (2013.01); *F17C 3/08* (2013.01)

USPC ............ 96/108; 96/9; 96/149; 96/154; 95/90; 95/95; 95/101; 95/102; 55/359

(58) Field of Classification Search
CPC .... A47J 41/028; B01D 53/0407; F16L 59/06; F17C 3/08; H01J 9/39; H01J 2211/52
USPC ......... 95/90, 95, 101, 102; 55/359; 96/9, 149, 96/154
See application file for complete search history.

(56) References Cited

U.S. PATENT DOCUMENTS

| 4,726,974 A | * | 2/1988 | Nowobilski et al. ............ 428/69 |
| 7,988,770 B2 | | 8/2011 | Hashida et al. |

(Continued)

FOREIGN PATENT DOCUMENTS

| JP | 57-044069 | 8/1980 |
| JP | 58-192516 | 11/1983 |

(Continued)

*Primary Examiner* — Christopher P Jones
(74) *Attorney, Agent, or Firm* — Hamre, Schumann, Mueller & Larson, P.C.

(57) ABSTRACT

A gas-adsorbing member is charged in low gas-permeable container (7) through its opening portion, wherein low gas-permeable container (7) is constituted by a hollow cylindrical metal member which is opened at its one end and is sealed at its other end and, also, has body portion (9) extending from the one end to the other end thereof such that the length of the body portion is equal to or larger than the maximum width of the end portions. Then, a sealing member is installed within the opening portion and near the opening portion. Then, the sealing member is molten by being heated. Thereafter, the sealing member within the opening portion is cooled to be solidified, thereby attaining sealing of the opening portion. Thus, it is possible to provide a gas-adsorbing-device fabricating method capable of suppressing degradations of the gas-adsorbing member and capable of reducing the fabrication costs.

12 Claims, 20 Drawing Sheets

(56) References Cited

U.S. PATENT DOCUMENTS

| | | |
|---|---|---|
| 8,147,598 B2 | 4/2012 | Hashida et al. |
| 8,152,901 B2 | 4/2012 | Hashida et al. |
| 2007/0196665 A1* | 8/2007 | Tenra et al. .................. 428/416 |
| 2009/0090242 A1 | 4/2009 | Hashida et al. |
| 2010/0242735 A1 | 9/2010 | Hashida et al. |
| 2010/0263330 A1 | 10/2010 | Hashida et al. |
| 2010/0263539 A1 | 10/2010 | Hashida et al. |
| 2010/0263540 A1 | 10/2010 | Hashida et al. |

FOREIGN PATENT DOCUMENTS

| | | |
|---|---|---|
| JP | 59-056970 | 4/1984 |
| JP | 9-512088 | 12/1997 |
| JP | 2007-155088 | 6/2007 |
| JP | 2008-055365 | 3/2008 |
| JP | 2008-200617 | 9/2008 |
| WO | 96/01966 | 1/1996 |

* cited by examiner

FIG. 2A
FIG. 2B
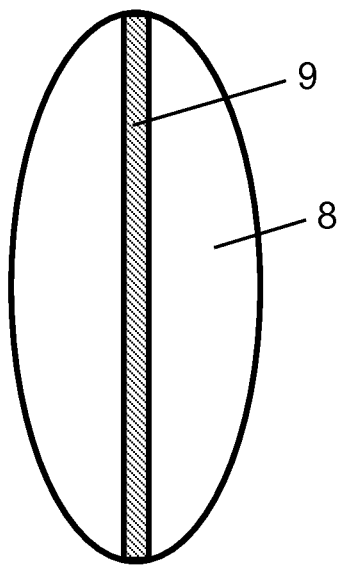

FIG. 6A
FIG. 6B
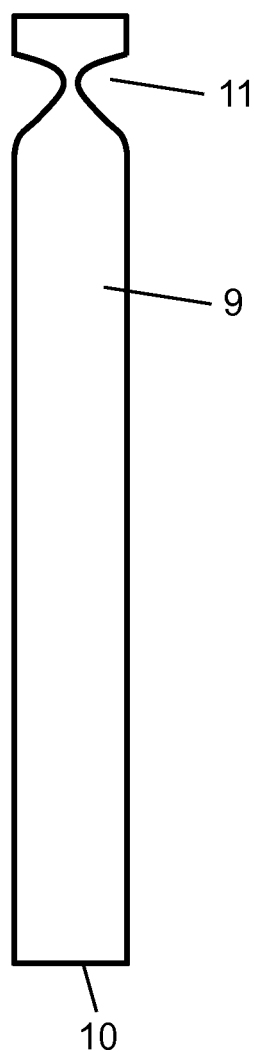
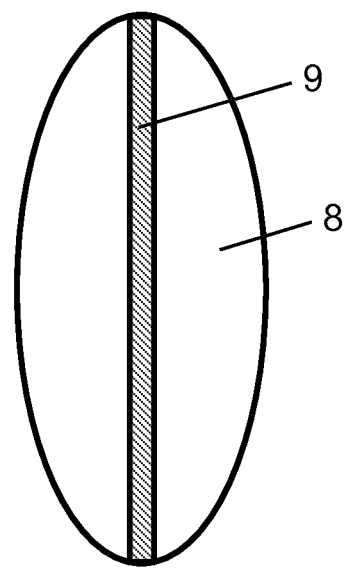

FIG. 8A
FIG. 8B
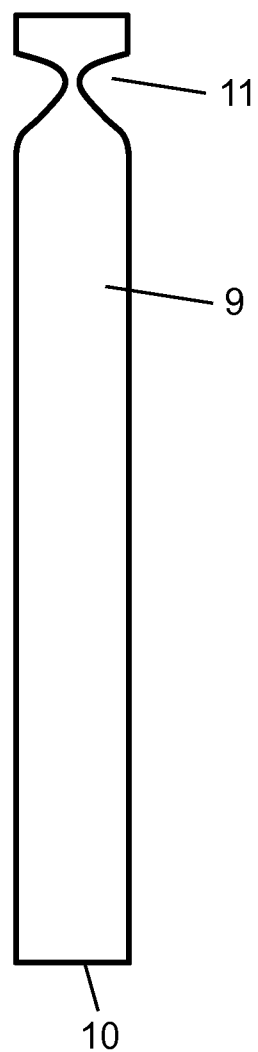
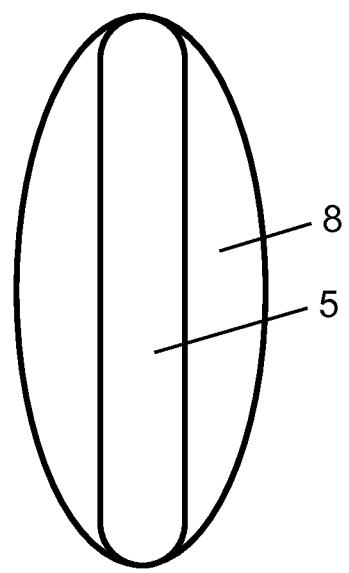

FIG. 10A
FIG. 10B
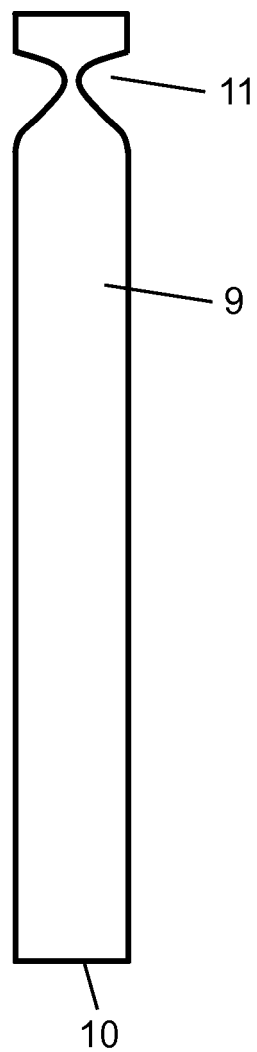
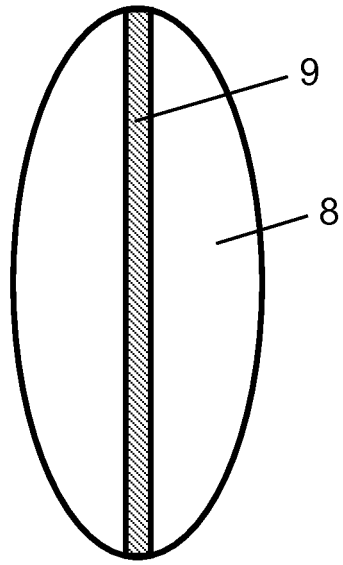

FIG. 20A
FIG. 20B
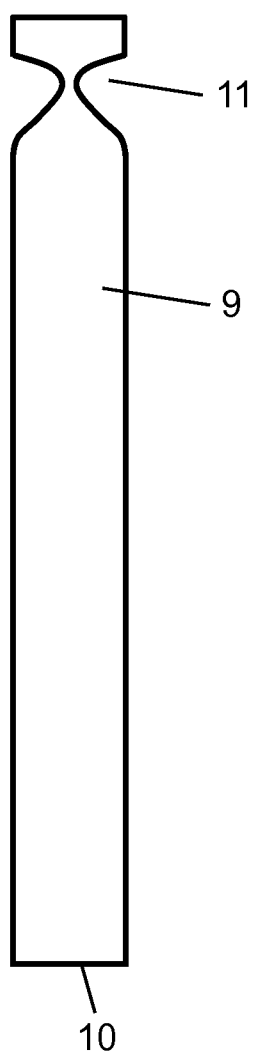
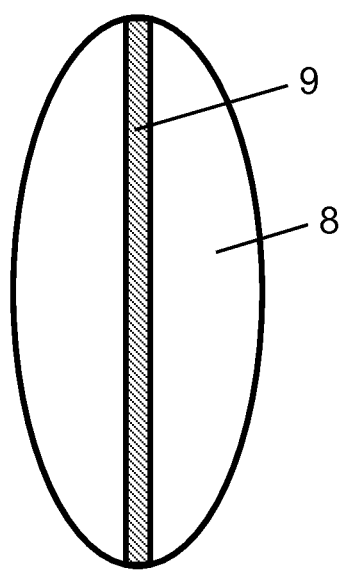

FIG. 22A
FIG. 22B
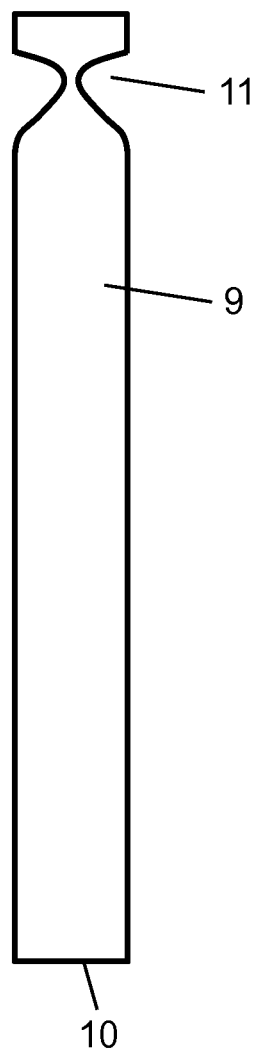
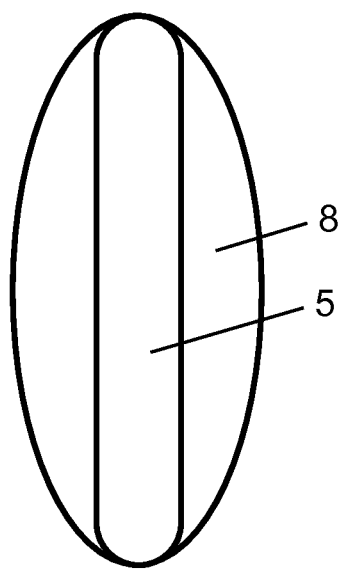

FIG. 23A
FIG. 23B
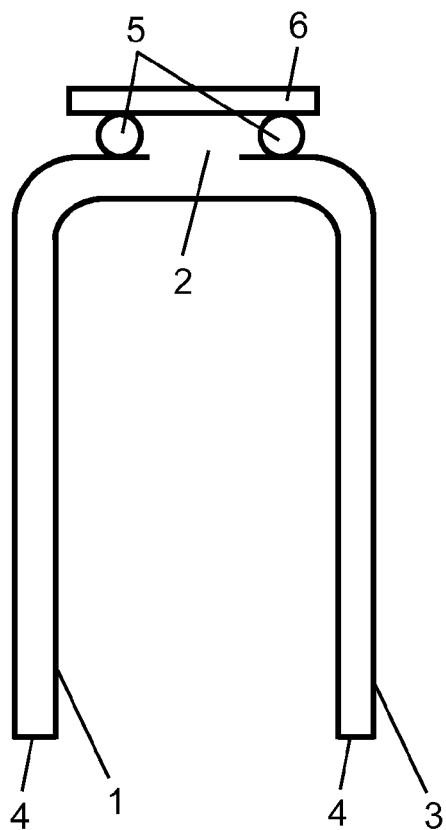
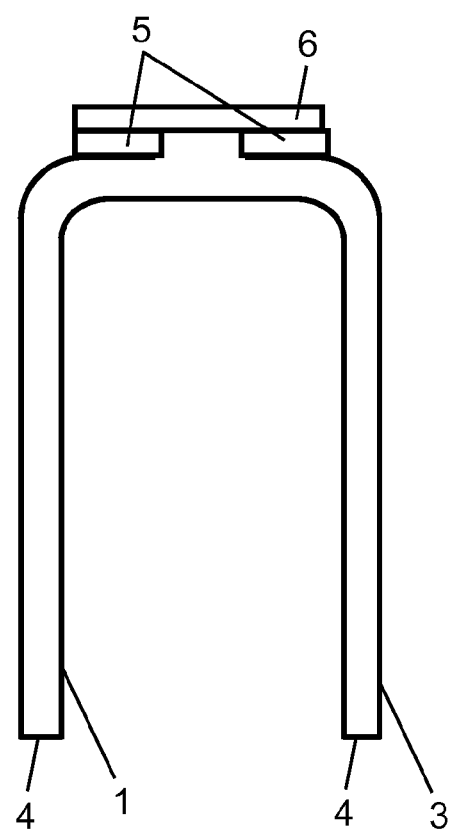

FABRICATION METHOD FOR GAS-ADSORBING DEVICE, GAS-ADSORBING DEVICE, AND METHOD OF USING THE SAME

TECHNICAL FIELD

The present invention relates to fabrication method for gas-adsorbing devices including gas-adsorbing members charged in containers, gas-adsorbing devices, and methods for using gas-adsorbing devices.

BACKGROUND ART

In recent years, there have been increasing developments of apparatuses capable of exerting their performance in high-vacuum environments (hereinafter, referred to as vacuum apparatuses), such as vacuum thermal insulation members, vacuum thermal insulation containers, plasma displays.

For these vacuum apparatuses, residual gasses remaining during fabrication thereof and gasses introduced therein with time cause pressure rises inside thereof, which cause degradations of their performance. Therefore, attempts have been made to apply gas-adsorbing members thereto for absorbing such gasses.

If a gas-adsorbing member contacts with air in the atmosphere, the gas-adsorbing member absorbs the air, thereby degrading its gas absorbing ability. Therefore, attempts have been made to cover such a gas-adsorbing member with a low gas-permeable container or low gas-permeable material (refer to PTL 1, for example).

Further, when a gas-adsorbing member is required to be thermally treated for exerting its absorbing property, in order to cover the gas-adsorbing member with a low gas-permeable container for sealing it, it is effective to employ a method which preliminarily installs a set of a low gas-permeable container and a sealing member within a heating oven and, further, raises the temperature therein, for thermally treating the gas-adsorbing member and melting the sealing member through the same processing, thereby attaining sealing.

As a conventional method for attaining such sealing, there has been a method disclosed in PLT 2, for example. Hereinafter, with reference to FIG. 23A and FIG. 23B, there will be described a conventional sealing method. As illustrated in FIG. 23A, internal container 1 and outer container 3 provided with ventilation hole 2 are bonded with end portion 4 to form a double structure, such that ventilation port 2 is an upside, and sealing member 5 is placed therearound. Sealing plate 6 is placed on sealing member 5 and, thereafter, vacuum heating treatment is performed thereon in a vacuum heating oven, so that a vacuum is created in the space formed by inner container 1 and outer container 3 and, thereafter, sealing member 5 is softened. This causes sealing plate 6 to get closer to outer container 3 due to its weight, which creates the state of FIG. 23B, thereby attaining sealing of ventilation hole 2.

However, with the method described in PLT 1, it is impossible to ensure that the low gas-permeable material covering the gas-adsorbing member has a sufficient gas barrier property. Therefore, the gas-adsorbing member absorbs ambient gasses during the processing for installing the gas-adsorbing member in the space containing gas to be absorbed thereby, which has made it hard to suppress degradations of the absorption member.

Further, with the method described in PLT 2, there is a need for use of the three members which are inner container 1, outer container 3 and sealing plate 6, thereby involving larger material costs and a larger number of processes. Therefore, with this method, it has been hard to reduce the costs for the air absorption device.

CITATION LIST

Patent Literature

PTL 1 Japanese Translation of PCT Publication No. 9-512088
PTL 2 Unexamined Japanese Patent Publication No. 58-192516

SUMMARY OF THE INVENTION

The present invention aims at providing a method for fabricating a gas-adsorbing device which is capable of suppressing degradations of a gas-adsorbing member during processing for fabricating the gas-adsorbing device and processing for installing it in a space containing gas to be absorbed thereby and, also, capable of reducing the fabrication costs.

According to the present invention, a gas-adsorbing member is charged in a low gas-permeable container through its opening portion, wherein the low gas-permeable container is made of a hollow cylindrical metal member having one end opened and the other end sealed, and a body portion from its one end to the other end having a length equal to or larger than the maximum width of the end portions. Thereafter, a sealing member is installed within the opening portion in the proximity of the opening portion, then, the pressures within the low gas-permeable container and the ambient space around the low gas-permeable container are reduced, then, the proximity of the opening portion and the sealing member is heated, such that the sealing member in a molten state closes the opening portion and the proximity thereof, and the molten sealing member closing the proximity of the opening portion inside the opening portion is cooled to be solidified, thereby attaining sealing of the opening portion.

With the aforementioned structure, the sealing member is preliminarily installed near the opening portion, which enables melting the sealing member, even under conditions where it is hard to perform operations thereon from outside and it is hard to install a movable portion due to the high temperature therein, such as inside of a vacuum heating oven. Thereafter, the temperature is reduced, so that the sealing member can be solidified, thereby sealing the opening portion of the low gas-permeable container. Further, there is no need for employing an additional sealing member, thereby enabling provision of the gas-adsorbing device with lower costs.

BRIEF DESCRIPTION OF DRAWINGS

FIG. 2A is a side view of the low gas-permeable container in the processing for fabricating the gas-adsorbing device according to the same embodiment, after the low gas-permeable container has been processed.

FIG. 2B is a top view of the same low gas-permeable container which has been processed.

FIG. 6A is a side view of the low gas-permeable container in the processing for fabricating the gas-adsorbing device according to the same embodiment, after the low gas-permeable container has been processed.

FIG. 6B is a top view of the same low gas-permeable container which has been processed.

FIG. 8A is a side view of the gas-adsorbing device fabricated according to a gas-adsorbing-device fabricating method according to the same embodiment, when viewed in the direction of the longer diameter thereof.

FIG. 8B is a top view of the gas-adsorbing device fabricated according to the gas-adsorbing-device fabricating method according to the same embodiment.

FIG. 10A is a side view of the low gas-permeable container in the processing for fabricating the gas-adsorbing device according to the same embodiment, after the low gas-permeable container has been processed.

FIG. 10B is a top view of the same low gas-permeable container which has been processed.

FIG. 20A is a side view of the low gas-permeable container in the processing for fabricating the gas-adsorbing device according to the same embodiment, after the low gas-permeable container has been processed.

FIG. 20B is a top view of the same low gas-permeable container which has been processed.

FIG. 22A is a side view of the gas-adsorbing device fabricated according to a gas-adsorbing-device fabricating method according to the same embodiment, when viewed in the direction of the longer diameter thereof.

FIG. 22B is a top view of the gas-adsorbing device fabricated according to the gas-adsorbing-device fabricating method according to the same embodiment.

FIG. 23A is a side view of a conventional container before it is sealed.

FIG. 23B is a side view of the same conventional low gas-permeable container, after it has been sealed.

DESCRIPTION OF EMBODIMENTS

Hereinafter, embodiments of the present invention will be described, with reference to the drawings. Further, these embodiments are not intended to restrict the present invention.

First Exemplary Embodiment

Figure 1:
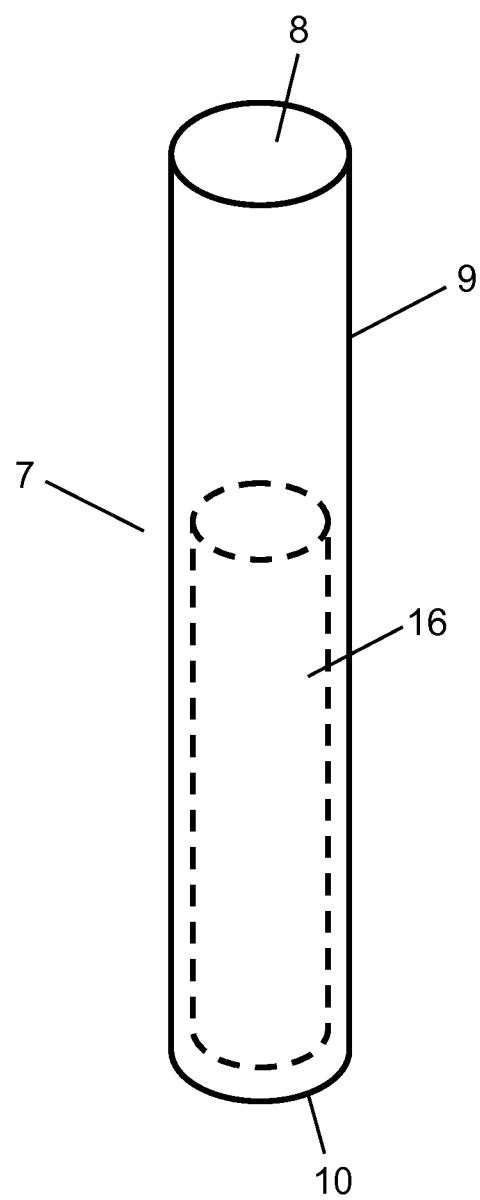
FIG. 1 is a perspective view of a low gas-permeable container in processing for fabricating a gas-adsorbing device according to a first embodiment of the present invention, before the low gas-permeable container is processed.

FIG. 1 is a schematic view of a low gas-permeable container in processing for fabricating a gas-adsorbing device according to a first embodiment of the present invention, before the low gas-permeable container is processed. In FIG. 1, low gas-permeable container 7 comprises a copper having a cylindrical shape with a bottom and, further, has opening portion 8 with a round shape at its one end portion (the upper end). Further, low gas-permeable container 7 has a cylindrical shape having a length of 120 mm and having body portion 9 with a wall thickness of 0.05 mm, and bottom surface 10 with a thickness of 1 mm and an outer diameter of 10 mm. Gas-adsorbing member 16 has been charged in low gas-permeable container 7 through opening portion 8. However, FIGS. 2A and 2B and the figures thereafter will not illustrate gas-adsorbing member 16.

FIGS. 2A and 2B are schematic views of the low gas-permeable container in the processing for fabricating the gas-adsorbing device, according to the present embodiment, after the low gas-permeable container has been processed. FIG. 2A is a side view of the low gas-permeable container which has been processed, and FIG. 2B is a top view of the low gas-permeable container which has been processed.

Referring to FIG. 2A, low gas-permeable container 7 is provided, near opening portion 8, with narrowed portion 11 like a portion squeezed in two directions radially opposing to each other.

Figure 3:
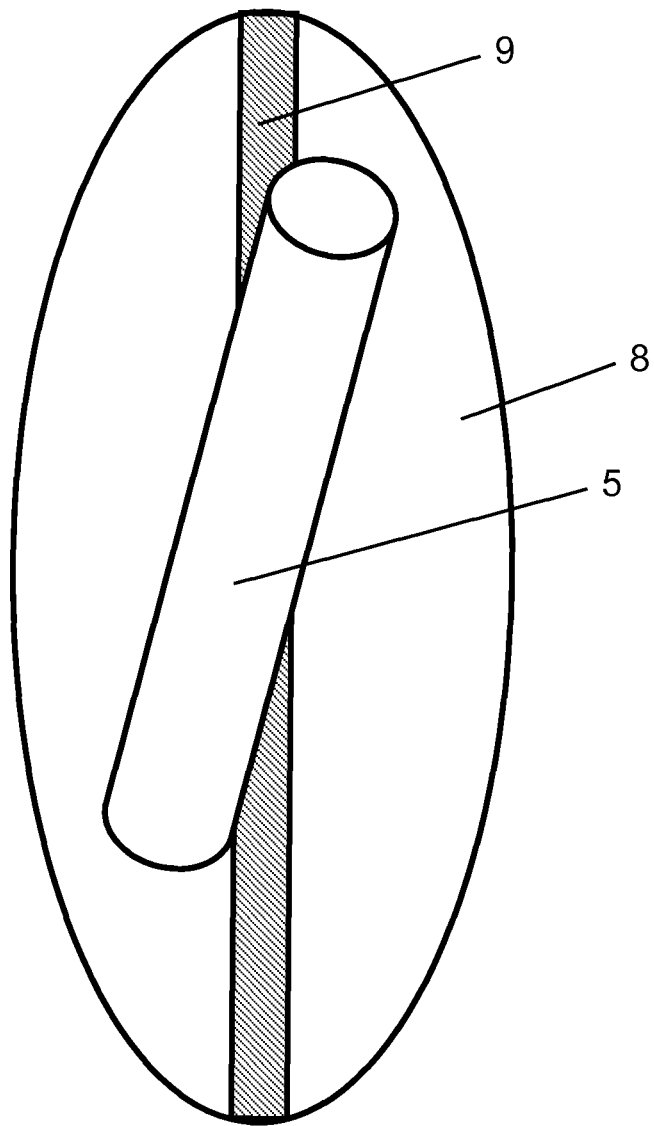
FIG. 3 is a top view of the low gas-permeable container in the processing for fabricating the gas-adsorbing device according to the same embodiment, at a state where a sealing member has been installed in the processed low gas-permeable container.

FIG. 3 is a top view of the low gas-permeable container in the processing for fabricating the gas-adsorbing device according to the present embodiment, at a state where a sealing member has been installed in the processed low gas-permeable container. Referring to FIG. 3, sealing member 5 is installed at an upper portion of the low gas-permeable container. Further, sealing member 5 has a cylindrical shape with a diameter of 2 mm and a length of 10 mm and, also, is made of a glass with a softening temperature of 530 degrees C. and a thermal expansion coefficient of $80*10^{-7}$/degrees C.

Figure 4A:
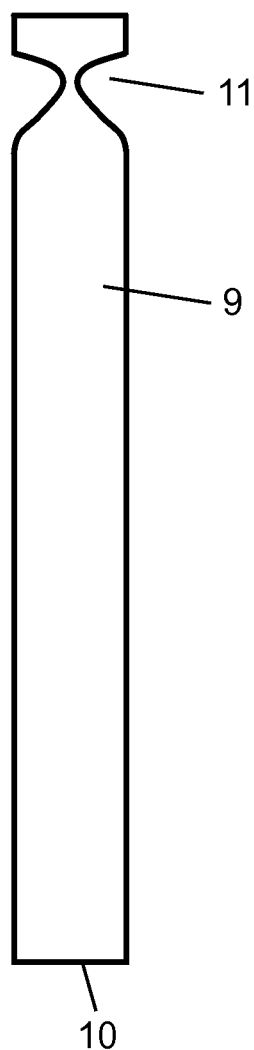
FIG. 4A is a side view of the gas-adsorbing device fabricated according to a gas-adsorbing-device fabricating method according to the same embodiment, when viewed in the direction of the longer diameter thereof.
Figure 4B:
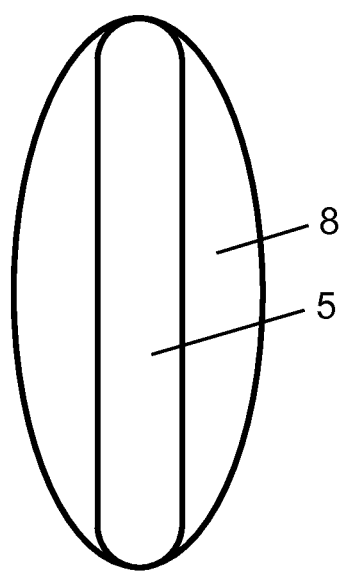
FIG. 4B is a top view of the gas-adsorbing device fabricated according to the gas-adsorbing-device fabricating method according to the same embodiment.

FIG. 4A is a side view of the gas-adsorbing device fabricated according to a gas-adsorbing-device fabricating method according to the present embodiment, when viewed in the direction of the longer diameter thereof. FIG. 4B is a top view of the gas-adsorbing device fabricated according to the gas-adsorbing-device fabricating method according to the present embodiment.

There will be described the gas-adsorbing device having the aforementioned structure, according to the present embodiment, with respect to the fabricating method therefor. A gas-adsorbing member capable of being provided with an absorbing property through thermal treatment is charged in low gas-permeable container 7 illustrated in FIG. 1, and this low gas-permeable container 7 is compressed near its opening portion 8 to form narrowed portion 11. This compression is performed, as follows. That is, two cylindrical stainless jigs (not illustrated) with a diameter of 3 mm are placed in a direction perpendicular to low gas-permeable container 7 such that these stainless jigs are parallel to each other and, also, sandwich, therebetween, the position in body portion 9 at a distance of 10 mm from opening portion 8 and, further, the distance therebetween is decreased. Further, in this processing, a stainless plate with a thickness of 1.2 mm and a width of 9 mm, as a spacer (not illustrated), is preliminarily inserted in opening portion 8, and the compression is completed at the instant at which the spacer comes into contact with an inner wall of low gas-permeable container 7.

Through the aforementioned processing, narrowed portion 11 is fabricated as illustrated in FIG. 2. In this case, narrowed portion 1 is formed, such that the gas-adsorbing member is accommodated within the space formed by body portion 9, bottom portion 10 and narrowed portion 11 of the low gas-permeable container. This series of operations is performed, by placing low gas-permeable container 7 such that its sealed end portion forms the bottom surface, in order to prevent the gas-adsorbing member charged in low gas-permeable container 7 from spilling therefrom. At this time, opening portion 8 is deformed, in shape, into an elliptical shape, in conformance to the deformation caused by the formation of narrowed portion 11.

Next, sealing member 5 is installed above narrowed portion 11. Further, at the aforementioned state, low gas-permeable container 7, the gas-adsorbing member and sealing member 5 are placed in a vacuum heating oven (not illustrated). The pressure in the vacuum heating oven is reduced to 0.01 Pa and, thereafter, the temperature therein is raised to 550 degrees C. for providing the gas-adsorbing member with an absorbing property. Thereafter, the temperature is raised to 600 degrees C. In this state, the glass has been molten and, thus, flowed into narrowed portion 11 and is held in narrowed portion 11 through its viscosity and its surface tension. As described above, low gas-permeable container 7 is heated in a vacuum with an attitude where it is vertically placed, such that bottom surface 10 is downside while opening portion 8 is an upside (the direction from opening portion 8 toward bottom surface 10 is a downward direction along the direction of gravity). Thereafter, the vacuum heating oven is cooled, so that sealing member 5 is solidified, thereby attaining sealing.

As described above, the gas-adsorbing-device fabricating method according to the present embodiment includes charging the gas-adsorbing member in low gas-permeable container 7 through opening portion 8, wherein low gas-permeable container 7 is constituted by a hollow cylindrical metal member which is opened at its one end and is sealed at its other end and, also, has body portion 9 extending from its one end to the other end thereof such that the length of body portion 9 is equal to or larger than the maximum width of the end portions. Thereafter, this fabricating method includes installing sealing member 5 within opening portion 8 and near opening portion 8, then reducing the pressures within low gas-permeable container 7 and within the ambient space around low gas-permeable container 7, then heating the proximity of opening portion 8 and sealing member 5 such that sealing member 5 in a molten state gets to close the proximity of opening portion 8, and, thereafter, cooling and solidifying molten sealing member 5 closing the proximity of opening portion 8 inside opening portion 8, thereby attaining sealing of opening portion 8.

Further, with the gas-adsorbing-device fabricating method according to the present embodiment, the gas-adsorbing member can be enclosed in a closed space through substantially the same processing for activating the gas-adsorbing member in a high-vacuum and high-temperature environment and, thereafter, changing only the thermal treatment temperature, which can significantly inhibit the gas-adsorbing member having been activated from contacting with air. Further, it is possible to provide a gas-adsorbing device capable of suppressing degradations of the gas-adsorbing member, during the processing for fabricating the gas-adsorbing device, and during the processing for installing the gas-adsorbing device in a space containing gas to be absorbed thereby.

The gas-adsorbing device according to the present embodiment is sealed through the following processing, for example. After gas-adsorbing member 7 is charged, in the air, into low gas-permeable container 7 which is opened at its one side, narrowed portion 11 is provided therein at a position closer to opening portion 8 than the charged gas-adsorbing member. Further, sealing member 5 with thermoplasticity which has a larger size at least in a single direction than that of the gap in narrowed portion 11 is placed above narrowed portion 11, and low gas-permeable container 7 containing it is heated, in whole, in a vacuum. As a result thereof, the gas-adsorbing member is activated and, thereafter, sealing member 5 is molten and flows into narrowed portion 11 and, then, remains in narrowed portion 11 due to its surface tension and its viscosity. Accordingly, the gas-adsorbing member is enclosed in the closed space formed by low gas-permeable container 7 and sealing member 5. Thereafter, sealing member 5 is cooled, so that sealing member 5 is solidified and secured to narrowed portion 11, thereby attaining sealing.

Further, with the method for fabricating the gas-adsorbing device having the present structure, the sealing processing is performed using only sealing member 5, without using a sealing plate or other members, which eliminates the necessity of costs required for such a sealing plate. Further, there is no need for installing a movable portion for use in performing operations for enclosing low gas-permeable container 7 in a vacuum oven, which makes the sealing processing easier, thereby reducing the cost required for fabricating the gas-adsorbing device.

Further, with the method for fabricating the gas-adsorbing device having the present structure, in cases where there is a need for thermal treatment processing for providing the gas-adsorbing member with an absorbing property, it is possible to concurrently perform heating of the gas-adsorbing member and heating of sealing member 5. Namely, the sealing processing can be performed subsequently to the thermal treatment processing, which eliminates the necessity of energy for a temperature rise to the temperature for the thermal treatment processing, out of the energy for a temperature rise to the temperature for the sealing processing. This can reduce the equipment-operating electric power and the number of processes which are necessary for the fabrication of the gas-adsorbing device, which can reduce the cost for fabricating the gas-adsorbing device.

In order to install the absorption device having the present structure in a vacuum apparatus for causing it to absorb gas, it is necessary to employ a method for destructing low gas-permeable container 7 or forming a through hole therein. It is possible to employ, for example, a method which places a protruding object or the like, adjacent to low gas-permeable container 7, and, then, pushes the protruding object for causing a concentration of stresses.

With the fabrication of the gas-adsorbing device having the present structure, in cases of a gas-adsorbing member which is activated through vacuum thermal treatment, for example, it is possible to properly perform melting by heating and solidification by cooling, subsequently to the vacuum thermal treatment, which enables fabricating the gas-adsorbing device without causing it to come into contact with external air. This enables fabricating the gas-adsorbing device without performing operations in a glove box, thereby suppressing degradations of the gas-adsorbing member during the gas-adsorbing-device fabricating processing and, also, suppressing cost increases.

Further, the sealing processing can be attained by only heating the entirety or the proximity of sealing member 5, which eliminates the necessity for installing a movable portion for use in enclosing opening portion 8 in a glove box, thereby facilitating the sealing, thereby enabling provision of the gas-adsorbing device with lower costs.

In this case, low gas-permeable container 7 comprises a metal. Therefore, when low gas-permeable container 7 has been installed in a vacuum apparatus, low gas-permeable container 7 is less prone to damage the vacuum apparatus. For example, in cases where the vacuum apparatus is a vacuum thermal insulation member, its outer coating member for preventing intrusions from the outside may be formed from a plastic laminate film, in many cases. In such cases, if the outer coating member is damaged by a fragment come off low gas-permeable container 7, this cause an intrusion of air into the inside of the outer coating member in the vacuum thermal insulation member, which prevents the vacuum thermal insulation member from exerting its effects. As described above, since the low gas-permeable container comprises a metal, it is possible to facilitate the application thereof to a vacuum apparatus.

Further, sealing member 5 may be any member which can be solidified to seal low gas-permeable container 7, by being cooled, after being thermally molten. Further, the sealing member 5 is required to pass, through the sealed portion, only an amount of gas as small as the amount of gas which can pass through low gas-permeable container 7.

With the aforementioned structure, it is possible to fabricate a gas-adsorbing device, as follows. That is, the gas-adsorbing member is charged into low gas-permeable container 7 through opening portion 8, wherein low gas-permeable container 7 is constituted by a hollow cylindrical copper member which is opened at its one end and is sealed at its other end and, also, has a body portion extending from its one end to the other end thereof such that the length of the body portion is equal to or larger than the maximum width of the end portions. Thereafter, sealing member 5 is installed near opening portion 8, then the pressures within low gas-permeable container 7 and within the ambient space around low gas-permeable container 7 are reduced, then the proximity of opening portion 8 and sealing member 5 is heated such that sealing member 5 in a molten state gets to close the proximity of opening portion 8, and, thereafter, molten sealing member 5 closing the proximity of opening portion 8 inside opening portion 8 is cooled to be solidified, thereby attaining sealing of opening portion 8.

As a result thereof, the gas-adsorbing member is inhibited from being degraded during the processing for fabricating the gas-adsorbing device, which can improve the performance thereof. Further, it is possible to reduce the material cost and the number of processes which are required for the fabrication thereof, which enables provision of an inexpensive gas-adsorbing device. Furthermore, since the gas-adsorbing member is inhibited from being degraded during the fabricating processing and, thus, can have an excellent absorbing ability and, also, low gas-permeable container 7 has an excellent gas barrier property, which enables provision of a gas-adsorbing device which does not degrade its absorbing ability even when it is preserved for a longer time period.

Further, in the present embodiment, low gas-permeable container 7 is placed such that its sealed other end forms the bottom surface, the gas-adsorbing member is charged therein through opening portion 8, thereafter, narrowed portion 11 is formed in at least one position of the body portion closer to opening portion 8 than the charged gas-adsorbing member, sealing member 5 is installed above narrowed portion 11, the inside of low gas-permeable container 7 and the ambient space around low gas-permeable container 7 are reduced in pressure, then the proximity of narrowed portion 11 and sealing member 5 is heated such that sealing member 5 in a molten state gets to close narrowed portion 11 due to its surface tension, and, thereafter, molten sealing member 5 closing narrowed portion 11 through its surface tension within opening portion 8 is cooled to be solidified.

One of the characteristics of fabricating the gas-adsorbing device by sealing cylindrical low gas-permeable container 7 with sealing member 5 is enclosing the gas-adsorbing member in the gas-adsorbing device without performing operations within a glove box, thereby suppressing deactivation and degradations of the gas-adsorbing member due to contact thereof with gases.

Low gas-permeable container 7 which has been preliminarily provided with narrowed portion 11 in its body portion and, also, contains sealing member 5 installed above narrowed portion 11 is installed, such that it is vertically placed with bottom surface 10 being downside and opening portion 8 being an upside (the direction from opening portion 8 toward bottom surface 10 is a downward direction along the direction of gravity). Accordingly, sealing member 5 can be secured thereto above narrowed portion 11. Further, in cases where the amount of sealing member 5 is sufficient, when sealing member 5 has been molten by being heated, sealing member 5 is secured thereto, such that it seals narrowed portion 11 due to its surface tension. In the aforementioned way, it is possible to attain sealing at a desired position, without performing operations from outside a vacuum heating oven.

With the aforementioned structure, sealing member 5 installed in low gas-permeable container 7 can be prevented from falling toward the bottom surface and, also, can be secured to narrowed portion 11 after having been molten. By doing this within the vacuum heating oven, it is possible to seal opening portion 8 of low gas-permeable container 7 without bringing it into contact with air, which suppresses degradations of the gas-adsorbing member, thereby enabling provision of a gas-adsorbing device with higher performance.

In the present embodiment, low gas-permeable container 7 comprises a metal with a thickness of 2.0 mm or less (preferably, 0.5 mm or less). Accordingly, it is possible to easily destruct low gas-permeable container 7 or form a through hole therein, after it has been installed in a vacuum apparatus. Namely, a metal inherently has excellent strength, which makes it hard to destruct it or form a through hole therein. However, when the thickness thereof 2.0 mm or less (preferably, 0.5 mm or less), it is possible to destruct it or form a through hole therein. This allows the gas within the vacuum apparatus to easily pass through low gas-permeable container 7, which enables absorption of the gas. This makes it easier to apply the gas-adsorbing device to a vacuum apparatus. If the thickness thereof is larger than 2.0 mm, this makes low gas-permeable container 7 thicker, thereby making it harder to destruct it or form a through hole therein.

Further, since low gas-permeable container 7 comprises a metal, it is possible to suppress the formation of fragments which may damage the vacuum apparatus, when it is destructed. Furthermore, since low gas-permeable container 7 comprises a metal, it can withstand thermal treatment. Therefore, even when the gas-adsorbing member is required to be thermally treated in order to be provided with a gas absorbing property, it is possible to apply it to fabrication of a gas-adsorbing device.

In the present embodiment, low gas-permeable container 7 comprises copper or an alloy mainly composed of copper having a thickness of 0.5 mm or less. Copper has a melting point of 1084 degrees C., which is higher. Therefore, even when thermal treatment at a higher temperature is necessary for providing the gas-adsorbing member with an absorbing property, low gas-permeable container 7 can be adapted thereto. Further, since low gas-permeable container 7 has a thickness of 0.5 mm or less (preferably, 0.1 mm or less), it is possible to easily destruct it, which makes it easier to absorb gas within the vacuum apparatus. If the thickness thereof is larger than 0.5 mm, this make low gas-permeable container 7 thicker, which makes it harder to destruct it or form a through hole therein.

Further, in general, as the material of sealing member 5 which is mainly composed of a metal oxide or a silicon oxide, a material having a thermal expansion coefficient relatively closer to the thermal coefficient of copper can be selected, which facilitates bonding thereof.

Further, since low gas-permeable container 7 comprises copper, which is a metal of one type, it is possible to suppress the formation of fragments which may damage the vacuum apparatus, when it is destructed. Furthermore, since low gas-permeable container 7 comprises a metal, it can withstand thermal treatment. Therefore, even when the gas-adsorbing member is required to be thermally treated in order to be provided with a gas absorbing property, it is possible to apply it to fabrication of a gas-adsorbing device.

In the present embodiment, sealing member 5 is made of a glass. The type of this glass is not particularly specified, but this glass is desirably one being capable of exhibiting flowability at temperatures sufficiently lower than the melting point of low gas-permeable container 7 and, also, having a thermal expansion coefficient closer to that of the material forming low gas-permeable container 7.

A glass is mainly composed of a metal oxide or a silicon oxide. Therefore, even if sealing member 5 made of a bulk-type glass is brought into contact with low gas-permeable container 7 made of a sheet-type metal or a sheet-type alloy mainly composed of a metal, the metal atoms constituting low gas-permeable container 7 are hardly removed therefrom. As a result thereof, no through hole is formed in low gas-permeable container 7, thereby enabling sealing thereof. Further, glasses have been generally employed as sealing members for use in electronic apparatuses and, therefore, it is possible to provide the gas-adsorbing device with relatively lower costs.

With the gas-adsorbing device according to the present embodiment, the gas-adsorbing member is inhibited from being degraded during the fabrication processing and, therefore, can exhibit an excellent gas absorbing property. Furthermore, in cases of employing a gas-adsorbing member required to be thermally treated for activation thereof, it is possible to perform this thermal treatment and enclosure of the gas-adsorbing member in low gas-permeable container 7 through the same processing, thereby providing the advantage of reduced costs.

With the fabrication according to the fabricating method according to the present embodiment, it is possible to perform, in a vacuum space, all of processing for fabricating the gas-adsorbing device, processing for providing the gas-adsorbing member with an absorbing property, and operations for enclosing and sealing the gas-adsorbing member in low gas-permeable container 7. This significantly inhibits the gas-adsorbing member having been provided with the absorbing property from contacting with air, which enables provision of a gas-adsorbing device including the gas-adsorbing member with significantly reduced degradations.

Furthermore, the sealing processing is performed using only sealing member 5 without using a sealing plate or other members, which eliminates the necessity of costs for such a sealing plate. Further, this eliminates the necessity for installing a movable portion for use in performing operations for enclosing low gas-permeable container 7 in a vacuum oven, which makes the sealing processing easier, thereby enabling provision of an inexpensive gas-adsorbing device.

Further, with the method for fabricating the gas-adsorbing device having the present structure, in cases where there is a need for thermal treatment processing for providing the gas-adsorbing member with an absorbing property, it is possible to concurrently perform heating of the gas-adsorbing member and heating of sealing member 5. Namely, the sealing processing can be performed subsequently to the thermal treatment processing, which eliminates the necessity of energy for a temperature rise to the temperature for the thermal treatment processing, out of the energy for a temperature rise to the temperature for the sealing processing. This can reduce the equipment-operating electric power and the number of processes which are necessary for the fabrication of the gas-adsorbing device, which enables provision of an inexpensive gas-adsorbing device.

Furthermore, with the method for fabricating the gas-adsorbing device having the present structure, the sealing processing is performed using only the sealing member without using a sealing plate or other members, which eliminates the necessity of costs for such a sealing plate 5. Further, this eliminates the necessity for installing a movable portion for use in performing operations for enclosing low gas-permeable container 7 in a vacuum oven, which makes the sealing processing easier, thereby reducing the cost required for fabrication of the gas-adsorbing device.

Further, with the method for fabricating the gas-adsorbing device having the present structure, in cases where there is a need for thermal treatment processing for providing the gas-adsorbing member with an absorbing property, it is possible to concurrently perform heating of the gas-adsorbing member and heating of the sealing member. Namely, the sealing processing can be performed subsequently to the thermal treatment processing, which eliminates the necessity of energy for a temperature rise to the temperature for the thermal treatment processing, out of the energy for a temperature rise to the temperature for the sealing processing. This can reduce the equipment-operating electric power and the number of processes which are necessary for the fabrication of the gas-adsorbing device, thereby reducing the cost for fabrication of the gas-adsorbing device.

In order to apply the gas-adsorbing device to a vacuum apparatus for absorbing gas, it is necessary to destruct low gas-permeable container 7 or form a through hole therein. In order to form a through hole in low gas-permeable container 7, it is possible to employ, for example, a method which places a protruding object or the like, adjacent to the low gas-permeable container, and, then, pushes the protruding object thereagainst for causing a concentration of stresses.

While, in the present embodiment, a glass is employed as sealing member 5, it is also possible to employ a metal oxide or a silicon oxide, rather than a glass. As such a glass, it is possible to employ a well-known glass. A glass refers to an amorphous solid material which is mainly composed of a metal oxide or a silicon oxide, further exhibits excellent rigidity at room temperatures, degrades its rigidity with rising temperature and, further, has a glass transition temperature.

The type of the glass is not particularly specified, but this glass may be any glass whose temperature generally defined as a softening point is lower than the melting point of the low gas-permeable container and which exhibits flowability at a temperature at which the shape of the low gas-permeable container is maintained.

Further, in general, as the material of the sealing member which is mainly composed of a metal oxide or a silicon oxide, a material having a thermal expansion coefficient relatively closer to the thermal expansion coefficient of copper can be selected, which facilitates bonding thereof.

Further, it is desirable that the material of the sealing member has a thermal expansion coefficient closer to that of the material which forms low gas-permeable container 7. However, this is not desirable, when low gas-permeable container 7 comprises a soft metal, as aluminum, or comprises a metal which has poor flexibility but has a significantly smaller thickness and, therefore, can extend in conformance to sealing member 5.

In this case, low gas-permeable container 7 has a gas permeability of $10^4 [cm^3/m^2 \cdot day \cdot atm]$ or less, desirably has a gas permeability of $10^3 [cm^3/m^2 \cdot day \cdot atm]$ or less, and more desirably has a gas permeability of $10^2 [cm^3/m^2 \cdot day \cdot atm]$ or less.

A cylindrical member refers to a hollow object elongated in a single direction.

End portions refer to boundary portions of a cylindrical member which abut on the ambience in the direction along the longest part of the cylindrical member, and its bottom surface and upper surface correspond thereto.

The maximum width of end portions refers to the length of a longest line segment, out of line segments each connecting a single point to another point in an end portion. For example, in cases where the end portions have an elliptical shape, the maximum width of the end portions refers to the length of their longer diameter.

A body portion refers to the portion of a cylindrical member which forms a major part thereof and, also, refers to the portion of the cylindrical member which extends from its portion at a distance of about 5 mm from one end thereof to its portion at a distance of about 5 mm from the other end thereof.

Opening portion 8 refers to a portion of low gas-permeable container 7 which permits the inside of hollow low gas-permeable container 7 to communicate with the outside thereof without passing through the material forming low gas-permeable container 7 and, also, which enables charging the gas-adsorbing member therethrough.

Narrowed portion 11 refers to a portion of low gas-permeable container 7 which has reduced cross-sectional areas in the longitudinal direction and in the vertical directions, wherein the size and shape thereof can be determined in such a way as to prevent sealing member 5 from falling toward the bottom surface due to the gravity exerted on sealing member 5. Accordingly, when sealing member 5 has a larger size, it is possible to make narrowed portion 11 have a larger size. When sealing member 5 has a smaller size, it is necessary to make narrowed portion 11 have a smaller size.

Further, since low gas-permeable container 7 is made to have a thickness of 0.1 mm or less, it is possible to easily destruct it, in absorbing the ambient gas. Further, since low gas-permeable container 7 comprises copper, which is a metal of one type, it has the property of being less prone to form fragments and, thus, has the property of being less prone to damage the vacuum apparatus, when it is destructed. For example, in cases where the vacuum apparatus is a vacuum thermal insulation member, its outer coating member for preventing intrusions from the outside may be formed from a plastic laminate film, in many cases. In such cases, if the outer coating member is damaged by a fragment come off low gas-permeable container 7, this cause an intrusion of air to the inside of the outer coating member in the vacuum thermal insulation member, which prevents the vacuum thermal insulation member from exerting its effects. As described above, since low gas-permeable container 7 comprises a metal, it is possible to easily apply it to a vacuum apparatus.

Further, low gas-permeable container 7 comprises copper which has a melting point of 1084 degrees C., which is higher. Therefore, even when thermal treatment at a higher temperature is necessary for providing the gas-adsorbing member with an absorbing property, low gas-permeable container 7 can be adapted thereto. Alloys mainly composed of copper also have thermal expansion coefficients closer to the thermal expansion coefficient of copper, and it is possible to select a sealing member having a thermal expansion coefficient close to the thermal expansion coefficients of them.

In this case, "copper" refers to a substance containing other elements than copper elements in an amount of 1 mol % or less, and "an alloy mainly composed of copper" refers to an alloy containing copper elements in an amount of 50 mol % or more.

The gas-adsorbing member refers to a member which is capable of absorbing noncondensable gases contained in gasses and is capable of absorbing them through physical absorption or chemical absorption. Particularly, a gas-adsorbing member capable of being provided with a gas absorbing property by being heated is suitable for the present invention and, for example, CuZSM-5 can be employed thereas. Further, it is possible to employ, thereas, oxides of alkali metals or alkaline-earth metals, hydroxides of alkali metals or alkaline-earth metals, and the like. Particularly, it is possible to employ, thereas, lithium oxides, lithium hydroxides, barium oxides, barium hydroxides, and the like.

Second Exemplary Embodiment

Figure 5:
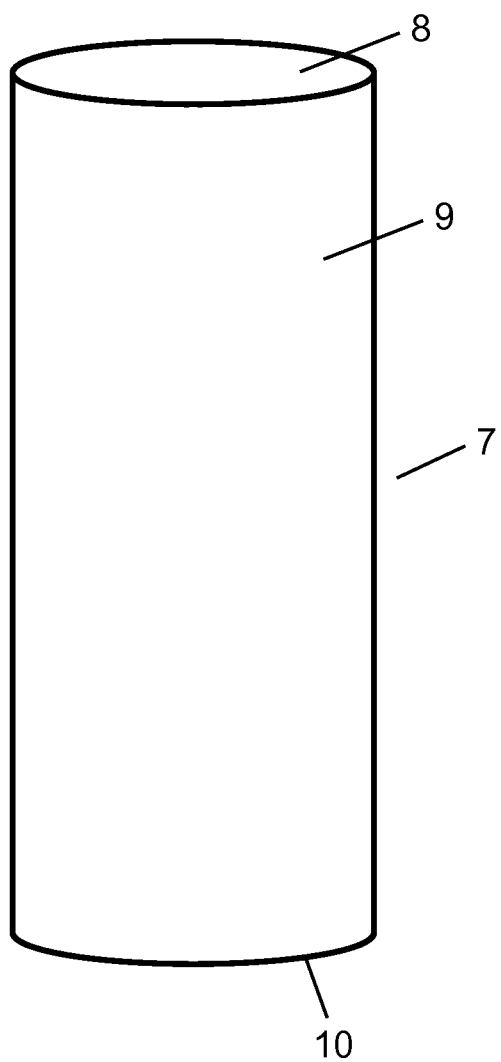
FIG. 5 is a perspective view of a low gas-permeable container in processing for fabricating a gas-adsorbing device according to a second embodiment of the present invention, before the low gas-permeable container is processed.

FIG. 5 is a schematic view of a low gas-permeable container, in processing for fabricating a gas-adsorbing device according to a second embodiment of the present invention, before the low gas-permeable container is processed. Referring to FIG. 5, low gas-permeable container 7 comprises an iron having a cylindrical shape with a bottom and, further, has opening portion 8 having an elliptical shape with a longer-diameter length of 14 mm and a shorter-diameter length of 6 mm, at its one end portion (the upper end). Further, low gas-permeable container 7 has a length of 120 mm and has body portion 9 with a wall thickness of 0.03 mm, and bottom surface 10 with a thickness of 0.5 mm, wherein body portion 9 has the same cross-sectional shape as that of opening portion 8.

FIGS. 6A and 6B are schematic views of the low gas-permeable container which has been processed, in the processing for fabricating the gas-adsorbing device, according to the present embodiment. FIG. 6A is a side view of the low gas-permeable container which has been processed, and FIG. 6B is a top view of the low gas-permeable container which has been processed. Referring to FIG. 6A, low gas-permeable container 7 is provided, near opening portion 8, with narrowed portion 11, like a portion squeezed in two directions radially opposing to each other. Narrowed portion 11 has a width of 0.2 mm.

Figure 7:
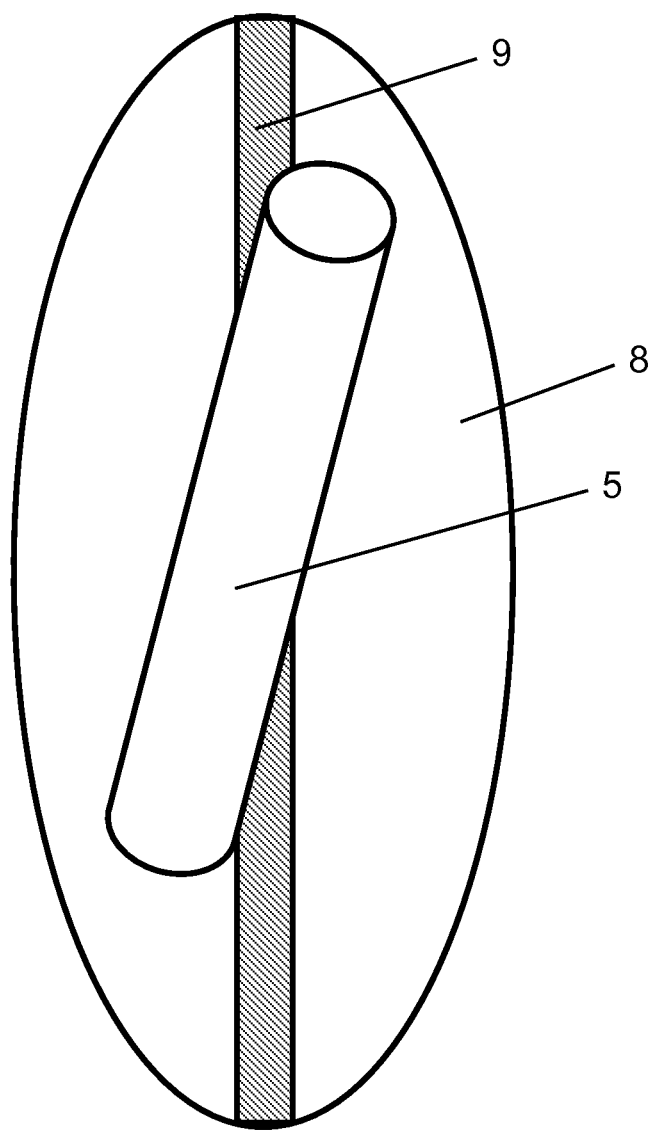
FIG. 7 is a top view of the low gas-permeable container in the processing for fabricating the gas-adsorbing device according to the same embodiment, at a state where a sealing member has been installed in the processed low gas-permeable container.

FIG. 7 is a top view of the low gas-permeable container in the processing for fabricating the gas-adsorbing device according to the present embodiment, at a state where a sealing member has been installed in the processed low gas-permeable container. Referring to FIG. 7, sealing member 5 is installed above narrowed portion 11 in low gas-permeable container 7.

FIG. 8A is a side view of a gas-adsorbing device fabricated according to a gas-adsorbing-device fabricating method according to the present embodiment, when it is viewed in the direction of its longer diameter. FIG. 8B is a top view of the gas-adsorbing device fabricated according to the gas-adsorbing-device fabricating method according to the present embodiment. The same sealing member 5 and the same thermal treatment processing as those in the first embodiment are employed. In the present embodiment, low gas-permeable container 7 is changed in material and shape, from that of the first embodiment.

In the present embodiment, the low gas-permeable container comprises iron which has a melting point of 1535 degrees C., which is higher. Therefore, even when thermal treatment at a temperature higher than the melting point of copper is necessary for providing the gas-adsorbing member with an absorbing property, the low gas-permeable container can be adapted thereto.

Further, since low gas-permeable container 7 has a thickness of 0.03 mm, which is a smaller thickness, it is possible to easily destruct it or form a through hole therein, which makes it easier to absorb gas within a vacuum apparatus.

In this case, "iron" refers to a substance containing other elements than iron elements in an amount of 1 mol % or less, and "an alloy mainly composed of iron" refers to an alloy containing iron elements in an amount of 50 mol % or more.

Further, in general, as the material of sealing member 5 which is mainly composed of a metal oxide or a silicon oxide, a material having a thermal expansion coefficient relatively closer to the thermal coefficient of iron can be selected, which facilitates bonding thereof.

Further, iron is more inexpensive than aluminum and copper and, therefore, the gas-adsorbing device can be provided with lower costs. Further, low gas-permeable container 7 is made to have a thickness of 0.25 mm or less (preferably, 0.05 mm or less). Accordingly, it is possible to easily destruct it, thereby making it easier to absorb gas within the vacuum apparatus.

Further, since low gas-permeable container 7 comprises iron, which is a metal of one type, it is possible to inhibit the formation of fragments which may damage the vacuum apparatus, when it is destructed. Furthermore, since low gas-permeable container 7 comprises a metal, it can withstand thermal treatment. Therefore, even when the gas-adsorbing member is required to be thermally treated in order to be provided with a gas absorbing property, it is possible to apply it to fabrication of the gas-adsorbing device.

Third Exemplary Embodiment

Figure 9:
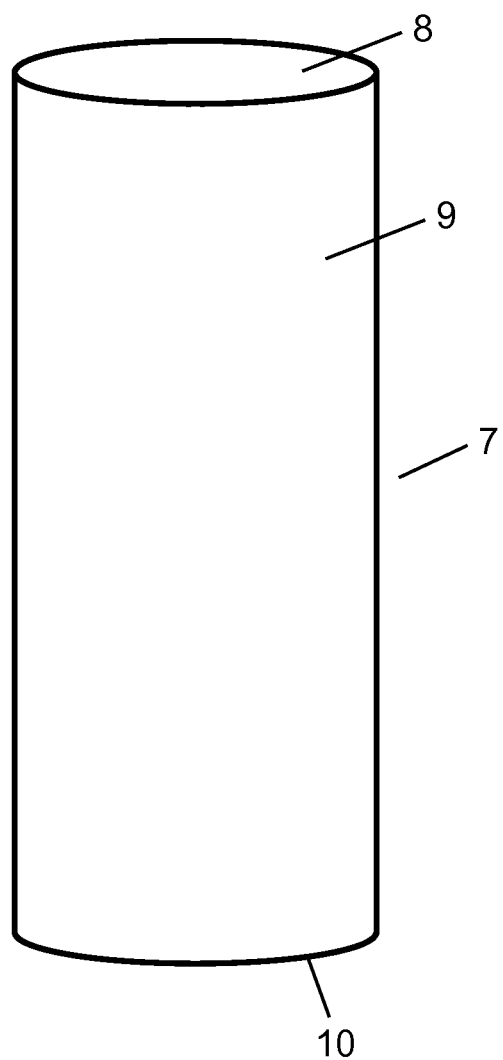
FIG. 9 is a perspective view of a low gas-permeable container in processing for fabricating a gas-adsorbing device according to a third embodiment of the present invention, before the low gas-permeable container is processed.

FIG. 9 is a schematic view of a low gas-permeable container, in processing for fabricating a gas-adsorbing device according to a third embodiment of the present invention, before the low gas-permeable container is processed. Referring to FIG. 9, low gas-permeable container 7 comprises an aluminum having an elliptical cylindrical shape with a bottom and, further, has opening portion 8 with an elliptical shape with a longer-diameter length of 14 mm and a shorter-diameter length of 6 mm, at its one end portion (the upper end). Further, low gas-permeable container 7 has a length of 120 mm and has body portion 9 with a wall thickness of 0.2 mm, and bottom surface 10 with a thickness of 0.5 mm, wherein body portion 9 has the same cross-sectional shape as that of opening portion 8.

FIGS. 10A and 10B are schematic views of the low gas-permeable container which has been processed, in the processing for fabricating the gas-adsorbing device, according to the present embodiment. FIG. 10A is a side view of the low gas-permeable container which has been processed, and FIG. 10B is a top view of the low gas-permeable container which has been processed. Referring to FIG. 10A, low gas-permeable container 7 is provided, near opening portion 8, with narrowed portion 11 like a portion squeezed in two directions radially opposing to each other. Narrowed portion 11 has a width of 0.2 mm.

Figure 11:
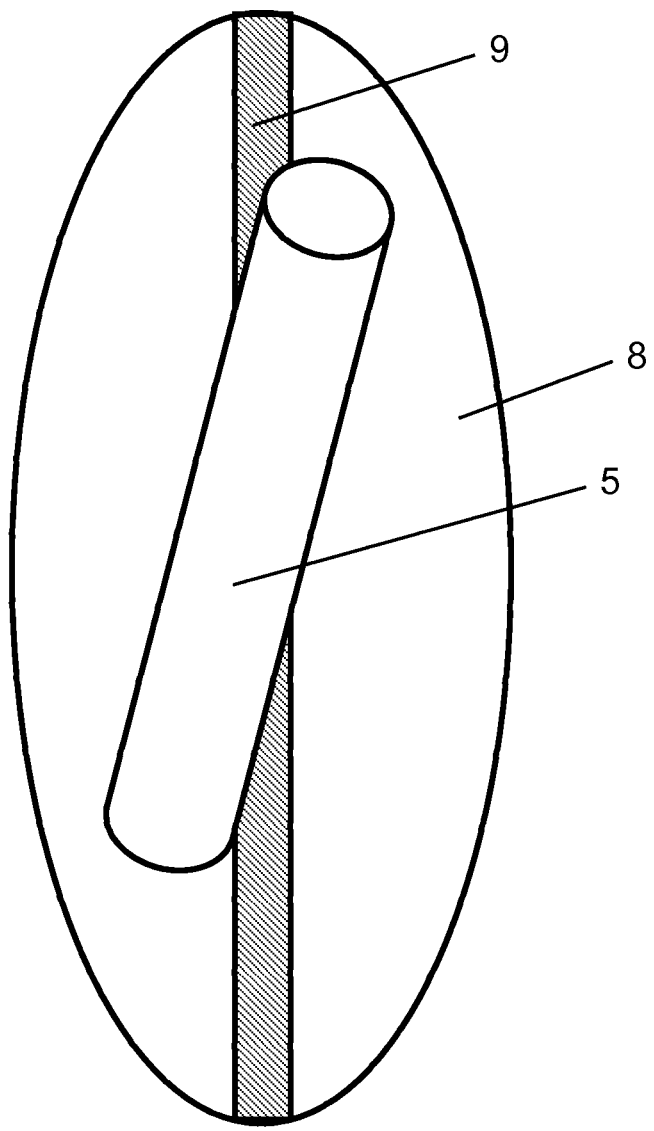
FIG. 11 is a top view of the low gas-permeable container in the processing for fabricating the gas-adsorbing device according to the same embodiment, at a state where a sealing member has been installed in the processed low gas-permeable container.

FIG. 11 is a top view of the low gas-permeable container in the processing for fabricating the gas-adsorbing device according to the present embodiment, at a state where a sealing member has been installed in the processed low gas-permeable container. Referring to FIG. 11, sealing member 5 is installed above narrowed portion 11 in low gas-permeable container 7.

Figure 12A:
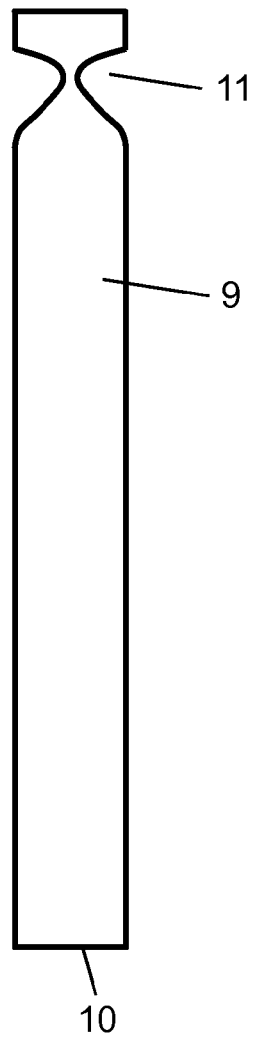
FIG. 12A is a side view of the gas-adsorbing device fabricated according to a gas-adsorbing-device fabricating method according to the same embodiment, when viewed in the direction of the longer diameter thereof.
Figure 12B:
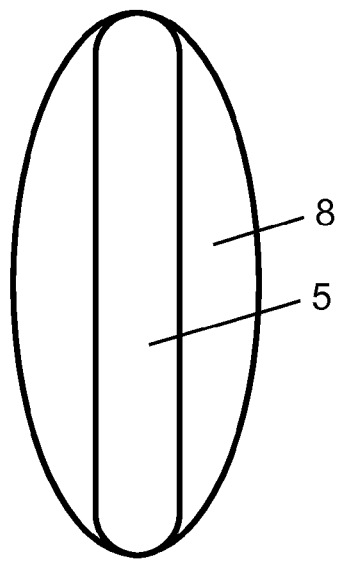
FIG. 12B is a top view of the gas-adsorbing device fabricated according to the gas-adsorbing-device fabricating method according to the same embodiment.

FIG. 12A and FIG. 12B is a side view of a gas-adsorbing device fabricated according to a gas-adsorbing-device fabricating method according to the present embodiment, when it is viewed in the direction of its longer diameter. FIG. 12B is a top view of the gas-adsorbing device fabricated according to the gas-adsorbing-device fabricating method according to the present embodiment.

Figure 13:
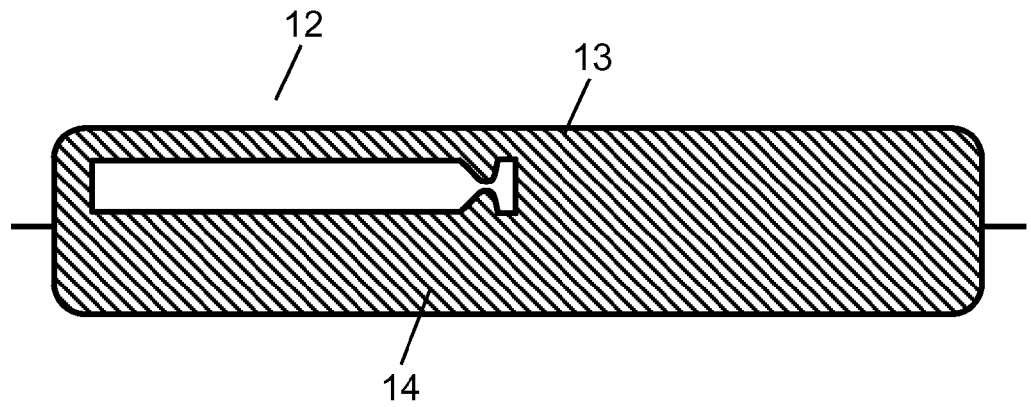
FIG. 13 is a schematic view of the gas-adsorbing device fabricated according to the gas-adsorbing-device fabricating method according to the same embodiment, at a state where the gas-adsorbing device has been applied to a vacuum thermal insulation member.

FIG. 13 is a schematic view of the gas-adsorbing device which is applied to a vacuum thermal insulation member, according to the third embodiment of the present invention. Referring to FIG. 13, vacuum thermal insulation member 12 is constituted by outer coating member 13 formed from a plastic laminate film, and core member 14 made of a glass fiber aggregation.

Figure 14:
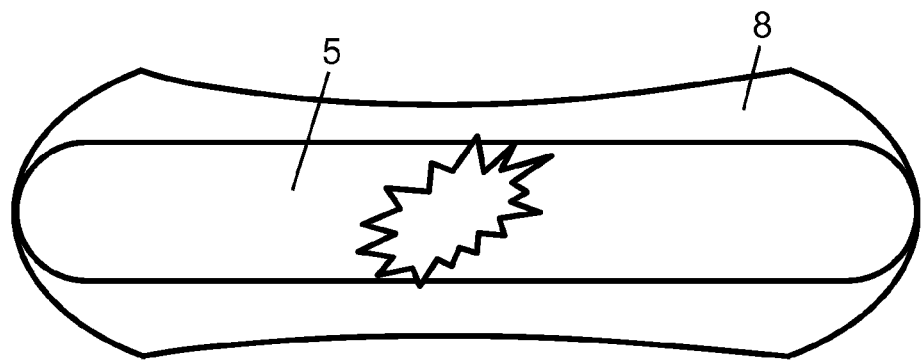
FIG. 14 is a schematic view of the proximity of the sealing member, after the sealing member has been compressed from outside of an outer coating member of the vacuum thermal insulation member, according to the same embodiment.

FIG. 14 is a schematic view of the proximity of sealing member 5, after sealing member 5 has been compressed from outside of outer coating member 13. Referring to FIG. 14, sealing member 5 has been destructed, which allows gas to pass through narrowed portion 11.

The same sealing member 5, the same thermal treatment processing and the like as those in the first embodiment are employed. In the present embodiment, low gas-permeable container 7 is changed in material and shape, from that of the first embodiment.

In the third embodiment, after the thermal treatment, cooling is performed at a speed of 300 degrees C./h or less, which causes annealing of the aluminum forming low gas-permeable container 7, thereby softening it. This facilitates opening the low gas-permeable container through, for example, a method for forming a through hole therein using a protruding object, after installing it in a space containing gas to be absorbed thereby. Further, under an atmospheric pressure, the gas-adsorbing device is compressed by the atmospheric pressure and, thus, has a thickness of 5 mm at its thinnest portion, out of the portion filled with the gas-adsorbing member.

In this case, the glass employed as sealing member 5 has a thermal expansion coefficient which is largely different from the thermal expansion coefficient of low gas-permeable container 7, but they can be bonded to each other, as follows. When low gas-permeable container 7 and sealing member 5 are cooled from a state where both of them have been softened at 600 degrees C., sealing member 5 shrinks more largely than low gas-permeable container 7, but low gas-permeable container 7 stretches in conformance to sealing member 5, thereby maintaining the bonding therebetween, since low gas-permeable container 7 has a thickness of 0.2 mm and, thus, has a smaller thickness.

In this viewpoint, it is desirable that the aluminum or the alloy mainly composed of aluminum which forms the low gas-permeable container has a thickness of 1.0 mm or less (more preferably, 0.2 mm or less).

As described above, aluminums or alloys mainly composed of aluminum have thermal expansion coefficients larger than those of copper and iron, and it is hard to select an aluminum or an alloy mainly composed of aluminum which has a thermal expansion coefficient equivalent to the thermal expansion coefficients of metal oxides or silicon oxides, which have been generally employed as sealing members 5. However, they can be bonded to each other, since low gas-permeable container 7 has a thickness of 1.0 mm or less.

In this case, "aluminum" refers to a substance containing other elements than aluminum elements in an amount of 1 mol % or less, and "an alloy mainly composed of aluminum" refers to an alloy containing aluminum elements in an amount of 50 mol % or more.

Next, examples of the present embodiment will be described, as examples 1 to 6. In the following examples, there will be described results of evaluations about the gas absorbing properties of gas-adsorbing devices applied to vacuum thermal insulation members, wherein these gas-adsorbing devices were fabricated with low gas-permeable containers 7 which were made of various types of materials to have various thicknesses, and with various types of sealing members 5.

The vacuum thermal insulation members were each constituted by a laminate film having a gas barrier property, called "outer coating member", and a plate-shaped porous spacer, called "core member", such that the spacer was covered with the laminate film, and the inside of the outer coating member was a vacuum. In general, at a room temperature, a thermal conductivity is dominated by components created by solids and components created by gasses. On the other hand, in a vacuum thermal insulation member, the inside of the outer coating member was a vacuum and, therefore, the thermal conductivity created by the core member, namely the solid, is dominant.

As can be seen from the aforementioned description, the thermal conductivity of a vacuum thermal insulation member depended on the gas pressure inside the outer coating member and, therefore, an evaluation of the amount of gas inside the outer coating member could be conducted, by determining the thermal conductivity. In this case, the thermal conductivities of the vacuum thermal insulation members were determined using AUTOλ073 manufactured by EKO INSTRUMENT CO., LTD.

Example 1

In the example 1, as low gas-permeable container 7, a cylindrical container made of an aluminum with a purity of 99.7% was placed, such that its longitudinal direction was along a lateral direction, wherein the cylindrical container had a length of 120 mm, an outer diameter of 10 mm and a thickness of 1.5 mm. A gas-adsorbing member was charged therein, and an aluminum solder composed of 95% aluminum and 5% silicon, in an amount of 10 g, as a sealing member, was installed near opening portion 8.

After it was installed in a vacuum heating oven, the pressure therein was reduced to 0.01 Pa, then the temperature therein was raised to 550 degrees C. to provide the gas-adsorbing member with a gas absorbing property. Thereafter, the temperature therein was raised to 600 degrees C. to melt the aluminum solder to seal opening portion 8 of low gas-permeable container 7, and, then, the aluminum solder was cooled to be solidified, thereby completing the fabrication of a gas-adsorbing device.

Aluminum is soft for a metal, but low gas-permeable container 7 had a thickness of 1.5 mm and, thus, had a slightly-larger thickness, which made it hard to form a through hole therein. Therefore, low gas-permeable container 7 was preliminarily provided with a cutout and, thereafter, was installed in a vacuum apparatus, in order to enable absorption of gas in the vacuum thermal insulation member, as the vacuum apparatus. Namely, since the outer coating member in the vacuum thermal insulation member was constituted by a plastic laminate film and, therefore, was easily deformed by external forces, it was possible to easily apply stresses to low gas-permeable container 7 through the outer coating member. By utilizing this fact, low gas-permeable container 7 was pushed at the proximity of the cutout and, then, low gas-permeable container 7 was fractured, namely destructed, with the cutout serving as a starting point, thereby enabling absorption of gas.

The gas-adsorbing device fabricated as described above was applied to the vacuum thermal insulation member. Before low gas-permeable container 7 was destructed, the vacuum thermal insulation member had a thermal conductivity of 0.0015 W/mk. It has been known that this vacuum thermal insulation member allows an intrusion of air in an amount of 0.05 cc per day thereinto, in cases where it is maintained at 100 degrees C. Accordingly, when it was maintained at 100 degrees C., the amount of gas absorbed by this gas-adsorbing device was determined to be 0.05 cc multiplied by the number of days elapsed before the start of rises of its heat conductivity. As a result of maintaining it at 100 degrees C., its heat conductivity began rising after the elapse of 100 days. This indicates that the amount of gas absorbed by the gas-adsorbing device was 5 cc.

On the other hand, after a gas-adsorbing member was enclosed in a quartz container, this quartz container containing it was thermally treated in its entirety. Then, this thermally-treated gas-adsorbing member was enclosed in a cylindrical container made of an aluminum with a purity of 99.7%, within a glove box, wherein this cylindrical container had a length of 120 mm, an outer diameter of 10 mm and a thickness of 1.5 mm. Thereafter, welding was performed thereon, thereby completing the fabrication of a gas-adsorbing device. The amount of gas absorbed by this gas-adsorbing device was determined according to the aforementioned method, which revealed that the amount of absorbed gas was 4.7 cc.

As described above, it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby.

Example 2

In the example 2, as low gas-permeable container 7, a cylindrical container made of a Pyrex (trademark) glass was placed such that its longitudinal direction was along a lateral direction, wherein the cylindrical container had a length of 120 mm, an outer diameter of 10 mm and a thickness of 1.5 mm. A gas-adsorbing member was charged therein and, thereafter, a Pyrex (trademark) glass in an amount of 10 g, as a sealing member, was installed near opening portion 8. Thermal treatment was performed thereon under the same condition as that in the first embodiment and, thereafter, only the proximity of sealing member 5 was heated to 700 degrees C. to bond low gas-permeable container 7 and sealing member 5 to each other, thereby sealing the opening portion of the low gas-permeable container. The gas-adsorbing device fabricated as described above was installed in a vacuum thermal insulation member and, then, it was pushed from outside of the outer coating member to destruct the low gas-permeable container, thereby enabling absorption of gas. In this case, no heat conductivity reduction was observed in 1% of vacuum thermal insulation members.

On the other hand, for a vacuum thermal insulation member determined to reduce its heat conductivity, the amount of absorbed gas was determined according to the same method as that of Example 1, which revealed that the amount of absorbed gas was 5 cc. This indicates that it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby.

Example 3

In the example 3, as low gas-permeable container 7, a cylindrical container made of an aluminum with a purity of 99.7% was placed, such that its longitudinal direction was along a vertical direction, wherein the cylindrical container had a length of 120 mm, an outer diameter of 10 mm and a thickness of 1.5 mm. A gas-adsorbing member was charged therein and, thereafter, narrowed portion 11 was formed such that the gas-adsorbing member was enclosed in the space defined by low gas-permeable container 7 and narrowed portion 11.

Thermal treatment was performed under the same condition as that of the first embodiment. An aluminum solder composed of 95% aluminum and 5% silicon, as a sealing member, was installed above the narrowed portion.

The amount of absorbed gas was determined according to the same method as that of Example 1, which revealed that the amount of absorbed gas was 5 cc. This indicates that it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby. Further, since narrowed portion 11 was preliminarily formed, it was possible to attain the sealing using the solder material in an amount of only 0.5 g. This indicates that it is possible to provide the gas-adsorbing device with lower costs.

Example 4

In the example 4, as low gas-permeable container 7, a cylindrical container made of copper was employed, wherein the cylindrical container had a length of 120 mm and a thickness of 0.05 mm. Further, as sealing member 5, a glass with a softening temperature of 485 degrees C. in an amount of 0.2 g was employed.

Thermal treatment was performed under the same condition as that of the first embodiment. The amount of absorbed gas was determined according to the same method as that of Example 1, which revealed that the amount of absorbed gas was 5 cc. This indicates that it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby. Further, since low gas-permeable container 7 was made of copper and also had a thickness of 0.05 mm and, thus, had a smaller thickness, it was possible to easily form a through hole therein by pushing a protruding object thereagainst.

Example 5

In the example 5, as low gas-permeable container 7, a cylindrical container made of iron was employed, wherein the cylindrical container had a length of 120 mm and a thickness of 0.03 mm. Further, as sealing member 5, a glass with a softening temperature of 485 degrees C. in an amount of 0.2 g was employed. Thermal treatment was performed under the same condition as that of the first embodiment.

A protruding object was pushed against low gas-permeable container 7 with the outer coating member in a vacuum thermal insulation member interposed therebetween, thereby forming a through hole in low gas-permeable container 7. Further, the amount of absorbed gas was determined according to the same method as that of Example 1, which revealed that the amount of absorbed gas was 5 cc. This indicates that it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby.

Further, low gas-permeable container 7 was made of iron, which has excellent hardness. However, low gas-permeable container 7 had a thickness of 0.03 mm and, thus, had a smaller thickness and, therefore, it was possible to easily form a through hole therein by pushing the protruding object thereagainst. Further, iron has a melting point of 1535 degrees C., which is higher. Therefore, even when thermal treatment at a temperature higher than the melting point of copper is necessary for providing the gas-adsorbing member with an absorbing property, low gas-impermeable container 7 can be adapted thereto.

Example 6

In the example 6, as low gas-permeable container 7, a cylindrical container made of an aluminum with a purity of 99.7% was employed, wherein the cylindrical container had a length of 120 mm and a thickness of 0.1 mm. Further, as sealing member 5, a glass with a softening temperature of 485 degrees C. in an amount of 0.2 g was employed. Thermal treatment was performed under the same condition as that of the first embodiment.

The gas-adsorbing device was installed in a vacuum thermal insulation member and, then, the sealing member was pushed through the outer coating member to destruct sealing member 5. Further, the amount of absorbed gas was determined according to the same method as that of Example 1, which revealed that the amount of absorbed gas was 5 cc. This indicates that it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby. This eliminates the necessity of a member for use in destructing low gas-permeable container 7, thereby enabling use of the gas-adsorbing device with lower costs.

Comparative Example 1

In the comparative example 1, a CuZSM-5 in an amount of 50 g, as a gas-adsorbing member, was charged in a quartz container and, thereafter, thermal treatment was performed thereon under the same thermal treatment condition as that of the first embodiment, thereby activating the gas-adsorbing member for absorbing gas. Thereafter, they were moved to the inside of a glove box filled with an argon gas in a sealed state.

The CuZSM-5 was extracted from the quartz container using butyl rubber gloves attached to the glove box and, then, the CuZSM-5 was charged into a device container. The CuZSM-5 which had been thermally treated was strongly coagulated due to static electricity and, therefore, was hard to handle, which necessitated a larger number of processes than that of the methods described in the examples.

As a result thereof, the amount of gas absorbed thereby was 4.7 cc. This was because a longer time period was required for attaining the sealing, which caused the gas-adsorbing member to absorb impurity gasses contained in the argon gas, thereby degrading its gas absorbing property.

Further, after charging thereof, sealing processing was required, which necessitated a sealing device and a number of sealing processes, thereby making the gas-adsorbing device expensive.

Further, the charging processing and the sealing processing were separated from each other, which necessitated equipment-operating electric power, thereby making the gas-adsorbing device expensive.

Comparative Example 2

In the comparative example 2, as a sealing member, a ethylene-acetate copolymer resin as a thermoplastic adhesive agent was employed. Thermal treatment was performed thereon under the same condition as that of the first embodiment.

In general, the upper limits of temperatures at which thermoplastic adhesive agents can be used are about 200 degrees C. Therefore, at temperatures equal to or higher than 200 degrees C., the sealing member exhibited excessive flowability, and the sealing member was not capable of remaining in the narrowed portion for sealing it, thereby resulting in a malfunction in the sealing. Accordingly, when the gas-adsorbing member is required to be thermally treated at a temperature of 200 degrees C. or higher, it is not appropriate to employ such a thermoplastic adhesive agent, as a sealing member.

Fourth Exemplary Embodiment

Figure 15:
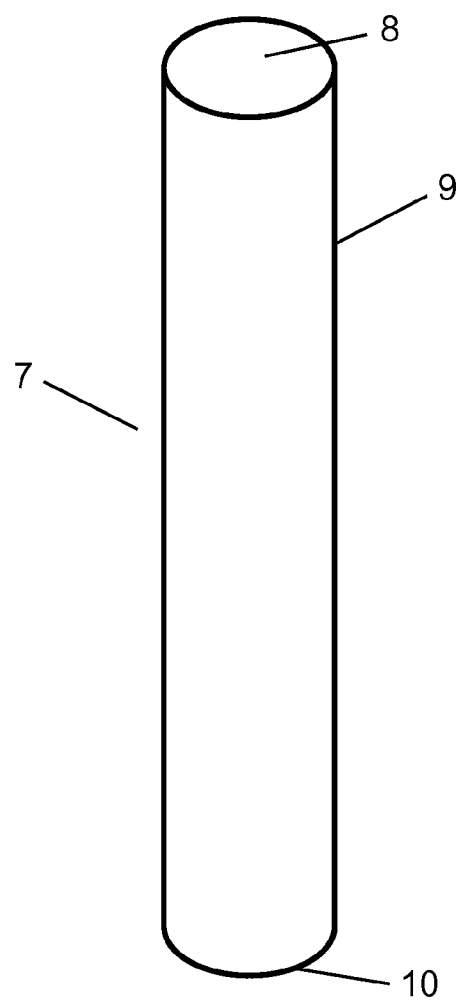
FIG. 15 is a perspective view of a low gas-permeable container in processing for fabricating a gas-adsorbing device according to a fourth embodiment of the present invention, before the low gas-permeable container is processed.

FIG. 15 is a perspective view of a low gas-permeable container in processing for fabricating a gas-adsorbing device, according to a fourth embodiment of the present invention, before the low gas-permeable container is not processed. Referring to FIG. 15, low gas-permeable container 7 comprises an aluminum having a cylindrical shape with a bottom and, further, has opening portion 8 with a round shape, at its one end portion (the upper end). Further, low gas-permeable container 7 has a cylindrical shape having a length of 120 mm and, also, has body portion 9 with a wall thickness of 0.15 mm, and bottom surface 10 with a thickness of 1 mm and an outer diameter of 10 mm.

Figure 16A:
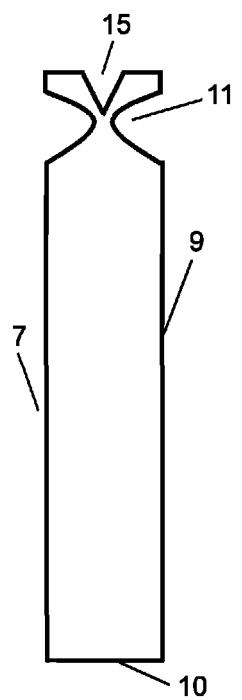
FIG. 16A is a side view of the low gas-permeable container in the processing for fabricating the gas-adsorbing device according to the same embodiment, after the low gas-permeable container has been processed.
Figure 16B:
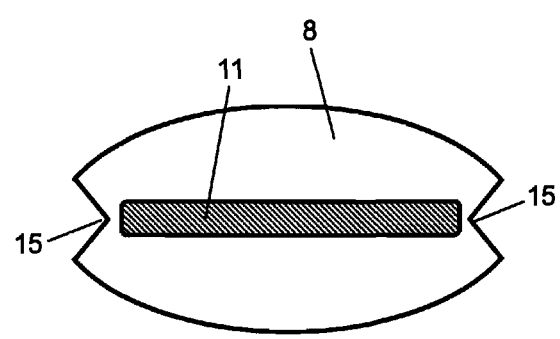
FIG. 16B is a top view of the same low gas-permeable container which has been processed.

FIGS. 16A and 16B are schematic views of the low gas-permeable container which has been processed, in the processing for fabricating the gas-adsorbing device, according to the present embodiment. FIG. 16A is a side view of the low gas-permeable container which has been processed, and FIG. 16B is a top view of the low gas-permeable container which has been processed. Referring to FIG. 16A, low gas-permeable container 7 is provided, near opening portion 8, with narrowed portion 11 like a portion squeezed in two directions radially opposing to each other. Further, opening portion 8 is provided with cutouts 15 at positions opposing to each other in the longitudinal direction of narrowed portion 11. Referring to FIG. 16B, narrowed portion 11 has a width of 1.2 mm, and the longitudinal direction of narrowed portion 11 and the line connecting these two cutout portions 15 to each other can be overlaid on the same straight line.

Figure 17:
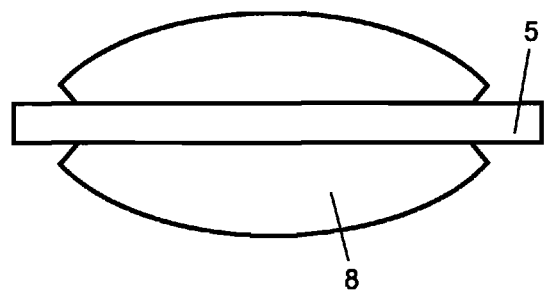
FIG. 17 is a top view of the low gas-permeable container in the processing for fabricating the gas-adsorbing device according to the same embodiment, at a state where a sealing member has been installed in the processed low gas-permeable container.

FIG. 17 is a top view of the processed low gas-permeable container, in the processing for fabricating the gas-adsorbing device according to the present embodiment, at a state where a sealing member has been installed therein. Referring to FIG. 17, sealing member 5 with a larger length than the interval between two cutout portions 15 is installed therein, such that it is fitted in two cutout portions 15. Further, sealing member 5 has a rod shape with a diameter of 1.5 mm and a length of 25 mm, and is made of an alloy composed of 95.0% aluminum and 5.0% silicon.

Figure 18:
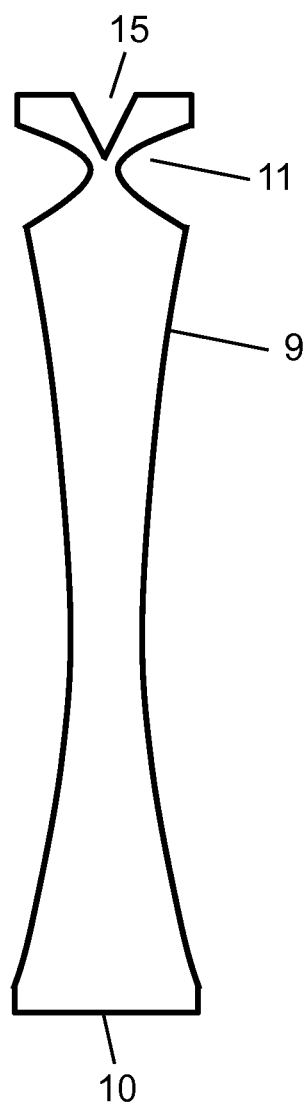
FIG. 18 is a side view of the gas-adsorbing device fabricated according to a gas-adsorbing-device fabricating method according to the same embodiment.

FIG. 18 is a side view of a gas-adsorbing device fabricated according to a gas-adsorbing-device fabricating method according to the present embodiment.

There will be described the gas-adsorbing device having the aforementioned structure, with respect to the fabricating method therefor. A gas-adsorbing member capable of having an activity by being thermally treated, such as CuZSM-5 (not illustrated), which is a copper ion-exchanged ZSM-5 type zeolite, in an amount of 1 g, is charged in low gas-permeable container 7 illustrated in FIG. 15, and this low gas-permeable container 7 is compressed near its opening portion 8 to form narrowed portion 11. This compression is performed, as follows. That is, two cylindrical stainless jigs (not illustrated) with a diameter of 3 mm are placed in a direction perpendicular to the longitudinal direction of low gas-permeable container 7, such that these stainless jigs are parallel to each other and, also, sandwich, therebetween, the position in body portion 9 at a distance of 10 mm from opening portion 8 and, further, the distance therebetween is decreased. Further, in this processing, a stainless plate with a thickness of 1.2 mm and a width of 9 mm, as a spacer (not illustrated), is preliminarily inserted in opening portion 8, and the compression is completed at the instant at which the spacer comes into contact with an inner wall of low gas-permeable container 7. Through the aforementioned processing, narrowed portion 11 is fabricated as illustrated in FIG. 16.

This series of operations is performed, by placing low gas-permeable container 7 such that its sealed end portion forms the bottom surface, in order to prevent the gas-adsorbing member charged in low gas-permeable container 7 from spilling therefrom. At this time, opening portion 8 is deformed, in shape, into an elliptical shape, in conformance to the deformation caused by the formation of narrowed portion 11.

Next, cutout portions 15 are formed at the two positions where the longer diameter of opening portion 8 intersect with the opening portion. In this case, the size of cutout portions 15 is determined, such that the lowermost portions of cutout portions 15 are close to an end portion of narrowed portion 11.

Next, sealing member 5 is installed with cutout portions 15 serving as support points. Further, at this state, low gas-permeable container 7, the gas-adsorbing member and sealing member 5 are installed in a vacuum heating oven (not illustrated). The pressure in the vacuum heating oven is reduced to 0.01 Pa, and the temperature therein is raised to 600 degrees C. At this state, sealing member 5 is in a half-molten state where aluminum is precipitated in a liquid of an alloy composed of aluminum and silicon. Sealing member 5 being in such a half-molten state has poor flowability, but can flow into narrowed portion 11 such that it seals narrowed portion 11 due to its surface tension (capillary phenomenon). Further, the vacuum heating oven is cooled, so that sealing member 5 is solidified, thereby attaining sealing.

In this case, the cooling is performed at a speed of 300 degrees C./h or less, which causes annealing of the aluminum which forms low gas-permeable container 7, thereby softening it. This facilitates opening the low gas-permeable container, when it has been installed in a space containing gas to be absorbed thereby. Further, under an atmospheric pressure, the gas-adsorbing device is compressed by the atmospheric pressure and, thus, has a thickness of 5 mm at its thinnest portion, out of the portion filled with the gas-adsorbing member.

For a gas-adsorbing device fabricated as described above, the amount of air absorbed thereby was determined after the elapse of 1 hour since the fabrication thereof, which revealed that the amount of absorbed air was 5 cc. Further, the same determination was conducted after the elapse of 30 days since the fabrication thereof, which revealed that the amount of absorbed air was also 5 cc. This revealed that this gas-adsorbing device induced no degradation of its performance even when it was preserved for a longer time period.

As described above, the method for fabricating the gas-adsorbing device according to the present embodiment includes charging the gas-adsorbing member in low gas-permeable container 7 through opening portion 8, wherein low gas-permeable container 7 is constituted by a hollow cylindrical metal member which is opened at its one end and is sealed at its other end and, also, has body portion 9 extending from its one end to the other end thereof such that the length of body portion 9 is equal to or larger than the maximum width of the end portions. Thereafter, this fabricating method includes installing sealing member 5 within opening portion 8 and near opening portion 8, then reducing the pressures within low gas-permeable container 7 and within the ambient space around low gas-permeable container 7, then heating the proximity of opening portion 8 and sealing member 5 such that sealing member 5 in a molten state gets to close the proximity of opening portion 8, and, thereafter, cooling and solidifying molten sealing member 5 closing the proximity of opening portion 8 inside opening portion 8, thereby attaining sealing of opening portion 8.

As a result thereof, the gas-adsorbing member is inhibited from being degraded during the processing for fabricating the gas-adsorbing device and, therefore, can have excellent performance. Further, it is possible to reduce the material cost and the number of processes which are required for the fabrication thereof, which enables provision of an inexpensive gas-adsorbing device.

Furthermore, since the gas-adsorbing member is inhibited from being degraded during the fabricating processing and, thus, can have an excellent absorbing ability and, also, low gas-permeable container 7 has an excellent gas barrier property, which enables provision of a gas-adsorbing device which does not degrade its absorbing ability even when it is preserved for a longer time period.

Further, according to the method for fabricating the gas-adsorbing device according to the present embodiment, low gas-permeable container 7 is placed such that its sealed other end forms the bottom surface, the gas-adsorbing member is charged therein through opening portion 8, thereafter, narrowed portion 11 is formed in at least one position of body portion 9 closer to opening portion 8 than the charged gas-adsorbing member, then sealing member 5 is installed above narrowed portion 11, the inside of low gas-permeable container 7 and the ambient space around low gas-permeable container 7 are reduced in pressure, then the proximity of narrowed portion 11 and sealing member 5 is heated such that sealing member 5 in a molten state gets to close narrowed portion 11 due to its surface tension, and, thereafter, molten sealing member 5 closing narrowed portion 11 through its surface tension within opening portion 8 is cooled to be solidified, thereby attaining sealing of opening portion 8.

Low gas-permeable container 7 which has been preliminarily provided with narrowed portion 11 in its body portion and, also, contains sealing member 5 installed above narrowed portion 11 is installed, such that it is vertically placed with bottom surface 10 being downside and opening portion 8 being an upside (the direction from opening portion 8 toward bottom surface 10 is a downward direction along the direction of gravity). Accordingly, sealing member 5 can be secured thereto above narrowed portion 11. Further, in cases where the amount of sealing member 5 is sufficient, when sealing member 5 has been molten by being heated, sealing member 5 is secured thereto, such that it seals narrowed portion 11 due to its surface tension. Thus, it is possible to attain the sealing at a desired position, without performing operations from outside a vacuum heating oven.

According to the present embodiment, sealing member 5 installed in low gas-permeable container 7 is prevented from falling toward the bottom surface and, also, can be secured to narrowed portion 11 after having been molten. By doing this within the vacuum heating oven, it is possible to seal opening portion 8 of low gas-permeable container 7 without bringing it into contact with air, which suppresses degradations of the gas-adsorbing member, thereby enabling provision of a gas-adsorbing device with higher performance.

In the present embodiment, low gas-permeable container 7 comprises aluminum or an alloy mainly composed of aluminum, while sealing member 5 comprises an alloy composed of aluminum and silicon.

Therefore, it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby. Further, it is possible to concurrently perform heating of the gas-adsorbing member and heating of sealing member 5, which can reduce the equipment-operating electric power and the number of processes which are necessary for the fabrication of the gas-adsorbing device, thereby reducing the cost for fabricating the gas-adsorbing device.

Further, sealing member 5 comprises an alloy containing aluminum in an amount of 88.4% or more. Therefore, even when low gas-permeable container 7 has a reduced thickness, the phenomenon of occurrences of through holes in low gas-permeable container 7 does not occur, which makes it easier to destruct low gas-permeable container 7 to secure ventilation therethrough, in a space containing gas to be absorbed.

Accordingly, it is possible to provide a gas-adsorbing device capable of suppressing degradations of the gas-adsorbing member, during the processing for fabricating the gas-adsorbing device, and during the processing for installing the gas-adsorbing device in the space containing air to be absorbed thereby.

Further, with the gas-adsorbing device fabricated according to the gas-adsorbing-device fabricating method according to the present embodiment, the gas-adsorbing member is inhibited from being degraded during the fabricating processing and, therefore, can exhibit an excellent gas absorbing property. Furthermore, in cases of employing a gas-adsorbing member required to be thermally treated for activation thereof, it is possible to perform this thermal treatment and enclosure of the gas-adsorbing member in low gas-permeable container 7 through the same processing, thereby reducing the cost.

Fifth Exemplary Embodiment

Figure 19:
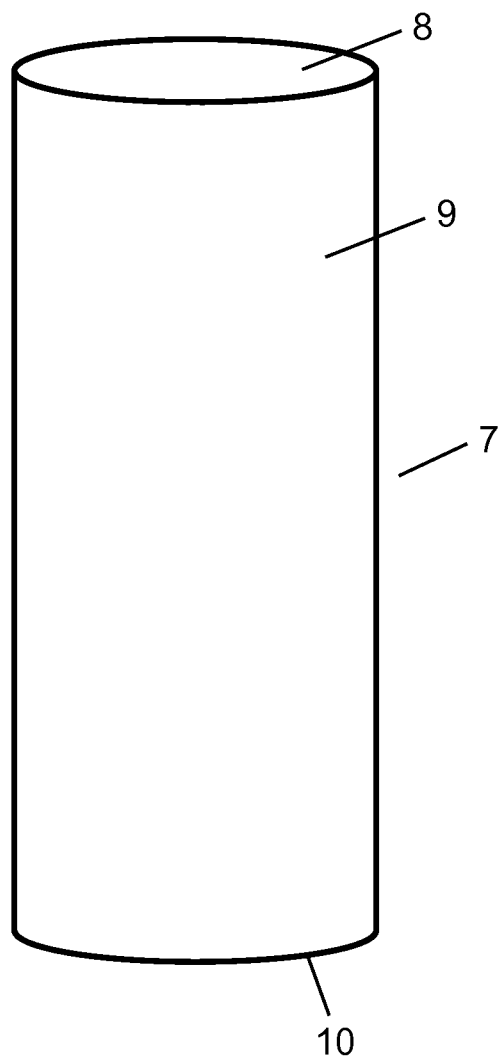
FIG. 19 is a perspective view of a low gas-permeable container in processing for fabricating a gas-adsorbing device according to a fifth embodiment of the present invention, before the low gas-permeable container is processed.

FIG. 19 is a schematic view of a low gas-permeable container, in processing for fabricating a gas-adsorbing device according to a fifth embodiment of the present invention, before the low gas-permeable container is processed. Referring to FIG. 19, low gas-permeable container 7 comprises an aluminum having an elliptical cylindrical shape with a bottom and, further, has opening portion 8 with an elliptical shape with a longer-diameter length of 14 mm and a shorter-diameter length of 6 mm, at its one end portion (the upper end). Further, low gas-permeable container 7 has a length of 120 mm and has body portion 9 with a wall thickness of 0.08 mm, and bottom surface 10 with a thickness of 1 mm, wherein body portion 9 has the same cross-sectional shape as that of opening portion 8.

FIGS. 20A and 20B are schematic views of the low gas-permeable container which has been processed, according to the present embodiment. FIG. 20A is a side view of the low gas-permeable container which has been processed, and FIG. 20B is a top view of the low gas-permeable container which has been processed. Referring to FIG. 20A, low gas-permeable container 7 is provided, near opening portion 8, with narrowed portion 11 like a portion squeezed in two directions opposing to each other in the direction of the shorter diameter. Narrowed portion 11 has a width of 0.2 mm.

Figure 21:
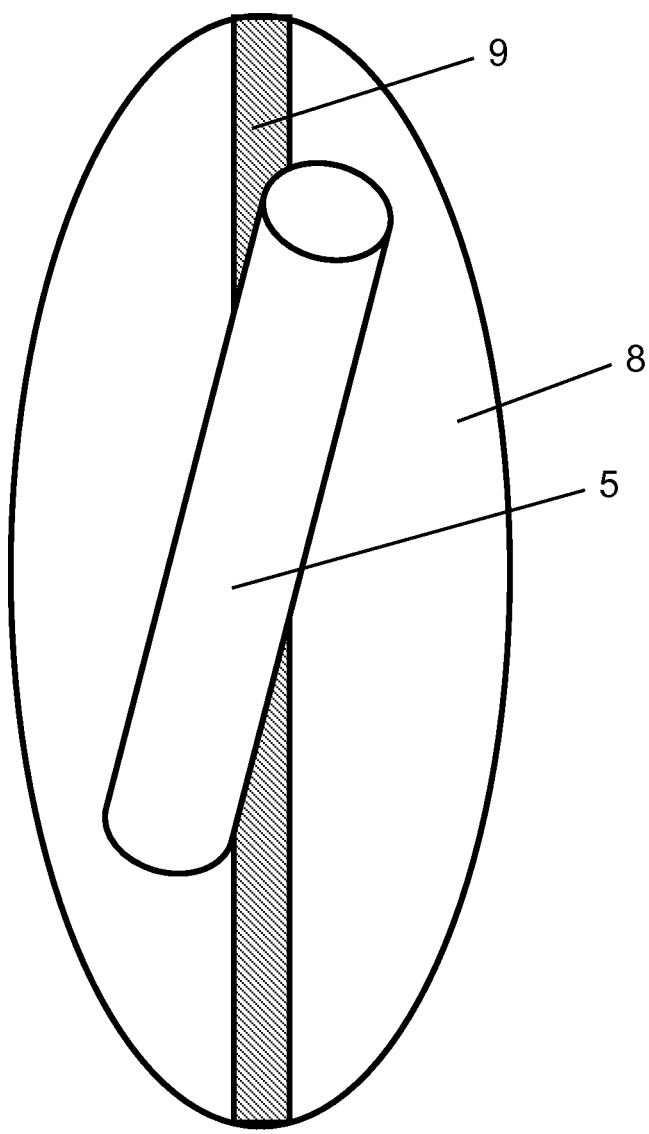
FIG. 21 is a top view of the low gas-permeable container in the processing for fabricating the gas-adsorbing device according to the same embodiment, at a state where a solder material has been installed in the processed low gas-permeable container.

FIG. 21 is a top view of the processed low gas-permeable container in the processing for fabricating the gas-adsorbing device according to the present embodiment, at a state where a sealing member has been installed therein. Referring to FIG. 21, sealing member 5 is installed such that it is accommodated above narrowed portion 11 of low gas-permeable container 7. Further, sealing member 5 has a rod shape with a diameter of 2 mm and a length of 10 mm, and comprises a low melting glass with a melting point of 485 degrees C.

In this case, "low melting glass" refers to a glass with a softening point equal to or lower than 660 degrees C., which is the melting point of aluminum. However, in cases of a glass with a softening point of about 660 degrees C., the glass exhibits poor flowability and, therefore, requires a longer time period to flow into narrowed portion 11 even though it is capable of sealing it in principle, which makes it impossible to ensure sufficient productivity. Accordingly, in order to ensure preferable productivity, it is desirable to employ a glass with a softening point of 600 degrees C. or lower, and it is more desirable to employ a glass with a softening point of 500 degrees C. or lower.

Further, in general, it is desirable to make a sealing material and a to-be-sealed object agree with each other, in terms of their thermal expansion coefficients. On the other hand, aluminum, which forms low gas-permeable container 7, has a thermal expansion coefficient larger than the thermal expansion coefficients of glasses. Therefore, in cases where the to-be-sealed object is of a bulk-type, it is hard to perform sealing thereof. However, in the present invention, the aluminum forming low gas-permeable container 7, which is the to-be-sealed object, has a smaller thickness and, thus, can deform in conformance to the low melting glass as sealing member 5, thereby enabling the sealing thereof.

FIGS. 22A and 22B are schematic views of a gas-adsorbing device fabricated according to a gas-adsorbing-device fabricating method according to the present embodiment. FIG. 22A is a side view of the gas-adsorbing device when it is viewed in the direction of the longer diameter thereof, and FIG. 22B is a top view of the gas-adsorbing device.

There will be described the gas-adsorbing device having the aforementioned structure, with respect to the fabricating method therefor. A gas-adsorbing member capable of having an activity by being thermally treated, such as CuZSM-5 (not illustrated), which is a copper ion-exchanged ZSM-5 zeolite, in an amount of 1 g, is charged in low gas-permeable container 7 illustrated in FIG. 19, and this low gas-permeable container 7 is compressed near its opening portion 8 to form narrowed portion 11.

This compression is performed, as follows. That is, two cylindrical stainless jigs (not illustrated) with a diameter of 3 mm are placed in a direction perpendicular to low gas-permeable container 7 such that these stainless jigs are parallel to each other and, also, are parallel to the direction of the longer diameter of low gas-permeable container 7 and, further, sandwich, therebetween, the position in body portion 9 at a distance of 10 mm from opening portion 8 and, then, the distance therebetween is decreased.

Further, in this processing, a stainless plate with a thickness of 200 micrometers and a width of 9 mm, as a spacer (not illustrated), is preliminarily inserted in opening portion 8, and the compression is completed at the instant at which the spacer comes into contact with an inner wall of low gas-permeable container 7. Through the aforementioned processing, narrowed portion 11 is fabricated as illustrated in FIG. 20. This series of operations is performed, by placing low gas-permeable container 7 such that its sealed end portion forms the bottom surface, in order to prevent the gas-adsorbing member charged in low gas-permeable container 7 from spilling therefrom.

Next, sealing member 5 is installed above narrowed portion 11 of low gas-permeable container 7. In this case, sealing member 5 has a diameter larger than the width of narrowed portion 11 and, therefore, is installed above narrowed portion 11. Further, at this state, low gas-permeable container 7, the gas-adsorbing member and sealing member 5 are installed in a vacuum heating oven (not illustrated). The pressure in the vacuum heating oven is reduced to 0.01 Pa, and the temperature therein is raised to 600 degrees C. At this state, sealing member 5 has a sufficiently-lower viscosity and, namely, certainly has sufficient flowability and, therefore, sealing member 5 flows into narrowed portion 11. Further, the vacuum heating oven is cooled, so that sealing member 5 is solidified, thereby attaining sealing.

At this time, the cooling is performed at a speed of 300 degrees C./h or less, which causes annealing of the aluminum which forms low gas-permeable container 7, thereby softening it. This facilitates opening the low gas-permeable container, when it has been installed in a space containing gas to be absorbed thereby.

With the gas-adsorbing device fabricated as described above, even though its body portion 9 had a wall thickness of 0.08 mm and, therefore, had a smaller thickness, no fine hole was induced therein, thereby ensuring an excellent sealing property.

The amount of air absorbed by the gas-adsorbing device was determined after the elapse of 1 hour since the fabrication thereof, which revealed that the amount of absorbed air was 5 cc. Further, the same determination was conducted after the elapse of 30 days since the fabrication thereof, which revealed that the amount of absorbed air was also 5 cc. This revealed that this gas-adsorbing device induced no degradation of its performance even when it was preserved for a longer time period.

As described above, the method for fabricating the gas-adsorbing device according to the present embodiment includes charging the gas-adsorbing member in low gas-permeable container 7 through opening portion 8, wherein low gas-permeable container 7 is constituted by a hollow cylindrical metal member which is opened at its one end and is sealed at its other end and, also, has body portion 9 extending from its one end to the other end thereof such that the length of body portion 9 is equal to or larger than the maximum width of the end portions. Thereafter, this fabricating method includes installing sealing member 5 within opening portion 8 and near opening portion 8, then reducing the pressures within low gas-permeable container 7 and within the ambient space around low gas-permeable container 7, then heating the proximity of opening portion 8 and sealing member 5 such that sealing member 5 in a molten state gets to close the proximity of opening portion 8, and, thereafter, cooling and solidifying molten sealing member 5 closing the proximity of opening portion 8 inside opening portion 8, thereby attaining sealing of opening portion 8.

As a result thereof, the gas-adsorbing member is inhibited from being degraded during the processing for fabricating the gas-adsorbing device, which can improve the performance thereof. Further, it is possible to reduce the material cost and the number of processes which are required for the fabrication thereof, which enables provision of an inexpensive gas-adsorbing device.

Furthermore, since the gas-adsorbing member is inhibited from being degraded during the fabricating processing and, thus, can have an excellent absorbing ability and, also, low gas-permeable container 7 has an excellent gas barrier property, which enables provision of a gas-adsorbing device which does not degrade its absorbing ability even when it is preserved for a longer time period.

Further, according to the method for fabricating the gas-adsorbing device according to the present embodiment, low gas-permeable container 7 is placed such that its sealed other end forms the bottom surface, the gas-adsorbing member is charged therein through opening portion 8, thereafter, narrowed portion 11 is formed in at least one position of body portion 9 closer to opening portion 8 than the charged gas-adsorbing member, sealing member 5 is installed above narrowed portion 11, the inside of low gas-permeable container 7 and the ambient space around low gas-permeable container 7 are reduced in pressure, then the proximity of narrowed portion 11 and sealing member 5 is heated such that sealing member 5 in a molten state gets to close narrowed portion 11 due to its surface tension, and, thereafter, molten sealing member 5 closing narrowed portion 11 through its surface tension within opening portion 8 is cooled to be solidified, thereby sealing opening portion 8.

Low gas-permeable container 7 which has been preliminarily provided with narrowed portion 11 in its body portion and, also, contains sealing member 5 installed above narrowed portion 11 is installed, such that it is vertically placed with bottom surface 10 being downside and opening portion 8 being an upside (the direction from opening portion 8 toward bottom surface 10 is a downward direction along the direction of gravity). Accordingly, sealing member 5 can be secured thereto above narrowed portion 11. Further, in cases where the amount of sealing member 5 is sufficient, when sealing member 5 has been molten by being heated, sealing member 5 is secured thereto, such that it seals narrowed portion 11 due to its surface tension. Thus, it is possible to attain the sealing at a desired position, without performing operations from outside the vacuum heating oven.

According to the present embodiment, sealing member 5 installed in low gas-permeable container 7 is prevented from falling toward the bottom surface and, also, can be secured to narrowed portion 11 after having been molten. By doing this within the vacuum heating oven, it is possible to seal opening portion 8 of low gas-permeable container 7 without bringing it into contact with air, which suppresses degradations of the gas-adsorbing member, thereby enabling provision of a gas-adsorbing device with higher performance.

In the present embodiment, since sealing member 5 is made of a glass (low melting glass), it is possible to inhibit the solder material and the glass from being alloyed, which enables reduction of the thickness of low gas-permeable container 7.

If aluminum is brought into contact with an aluminum alloy containing silicon at a high temperature, the aluminum is introduced into the alloy containing aluminum, which may induce fine holes in the aluminum container. However, since the solder material is made of a glass, even when low gas-permeable container 7 comprises a metal with a smaller thickness, such as an aluminum with a smaller thickness or a copper with a smaller thickness, it is possible to suppress the formation of fine holes therein due to alloying thereof with sealing member 5. Accordingly, since sealing member 5 is made of a glass, it is possible to make low gas-permeable container 7 have a smaller thickness.

Further, with the gas-adsorbing device fabricated according to the gas-adsorbing-device fabricating method according to the present embodiment, the gas-adsorbing member is inhibited from being degraded during the fabrication processing and, therefore, can exhibit an excellent gas absorbing property. Furthermore, in cases of employing a gas-adsorbing member required to be thermally treated for activation thereof, it is possible to perform this thermal treatment and enclosure of the gas-adsorbing member in low gas-permeable container 7 through the same processing, thereby reducing the cost.

As described above, the method for fabricating the gas-adsorbing device according to the present embodiment is adapted to include charging the gas-adsorbing member in the low gas-permeable container through its opening portion, wherein the low gas-permeable container is constituted by a hollow cylindrical metal member which is opened at its one end and is sealed at its other end and, also, has a body portion extending from its one end to the other end thereof such that the length of the body portion is equal to or larger than the maximum width of the end portions. Thereafter, this fabricating method includes installing the sealing member within the opening portion and near the opening portion, then reducing the pressures within the low gas-permeable container and within the ambient space around the low gas-permeable container, then heating the proximity of the opening portion and the sealing member such that the sealing member in a molten state gets to close the proximity of the opening portion, and, thereafter, cooling and solidifying the molten sealing member closing the proximity of the opening portion inside the opening portion, thereby attaining sealing of the opening portion.

If a gas-adsorbing member comes into contact with untargeted gas before being used, the gas-adsorbing member absorbs the gas, thereby reducing (degrading) its absorption capacity or losing its absorbing ability (being deactivated). Accordingly, such a gas-adsorbing member is required to be enclosed in a gas-adsorbing device which is prevented from contacting with external air, before it is used. Accordingly, one of the important functions of the gas-adsorbing device is suppressing the contact of the gas-adsorbing member with gas before it is used, in order to maintain the gas absorbing ability of the gas-adsorbing member. Accordingly, it has been necessary to fabricate such a gas-adsorbing device in a vacuum or in a gas which can not be absorbed by the gas-adsorbing member, such as an inert gas, such as argon, for example.

In general, the fabrications of gas-adsorbing devices have been conducted in glove boxes filled with an inert gas such as argon in many cases, which have induced disadvantageous conditions in view of costs, such as poor workability, necessity of a time period for handling, larger consumption of argon gas, and the like. Furthermore, one of the problems thereof has been degradations of the gas-adsorbing members, due to the existence of impurity gases in the glove boxes, such as air intruded from the outside thereof.

As described above, if a gas-adsorbing member having been activated is brought into contact with air, its absorbing property is degraded. Therefore, it is desirable that such a gas-adsorbing member is enclosed, as immediately as possible, within a space which allows intrusions of air thereinto at significantly-lower speeds, namely within a closed space, in such a way as to prevent the gas-adsorbing member from contacting with air.

As described below, with the gas-adsorbing-device fabricating method according to the present invention, it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby.

Namely, the gas-adsorbing member can be enclosed in a closed space, through substantially the same processing for activating the gas-adsorbing member in a high-vacuum and high-temperature environment and, thereafter, changing only the thermal treatment temperature, which can significantly suppress the contact of the activated gas-adsorbing member with air.

The sealing can be attained as follows, for example. After the gas-adsorbing member is charged, in the air, into a container which is opened at its one side, a narrowed portion is provided therein at a position closer to the opening portion than the charged gas-adsorbing member. Further, a thermoplastic sealing member having a larger size at least in a single direction than that of the gap in the narrowed portion is placed above the narrowed portion, and the container containing it is heated, in whole, in a vacuum. As a result thereof, the gas-adsorbing member is activated and, thereafter, the sealing member is molten and flows into the narrowed portion and, then, remains in the narrowed portion due to its surface tension and its viscosity. Accordingly, the gas-adsorbing member is enclosed in the closed space formed by the low gas-permeable container and the sealing member. Thereafter, the sealing member is cooled, so that the sealing member is solidified and secured to the narrowed portion, thereby attaining sealing thereof.

Further, according to the method for fabricating the gas-adsorbing device having the present structure, the sealing processing is performed using only the sealing member, without using a sealing plate or other members, which eliminates the necessity of costs required for such a sealing plate. Further, there is no need for installing a movable portion for use in performing operations for enclosing the low gas-permeable container in a vacuum oven, which makes the sealing processing easier, thereby reducing the cost required for fabricating the gas-adsorbing device.

Further, according to the method for fabricating the gas-adsorbing device having the present structure, in cases where there is a need for thermal treatment processing for providing the gas-adsorbing member with an absorbing property, it is possible to concurrently perform heating of the gas-adsorbing member and heating of the sealing member. Namely, the sealing processing can be performed subsequently to the thermal treatment processing, which eliminates the necessity of energy for a temperature rise to the temperature for the thermal treatment processing, out of the energy for a temperature rise to the temperature for the sealing processing. This can reduce the equipment-operating electric power and the number of processes which are necessary for the fabrication of the gas-adsorbing device, which can reduce the cost for fabricating the gas-adsorbing device.

In order to install the absorption device having the present structure in a vacuum apparatus for causing it to absorb a gas, it is necessary to employ a method for destructing the low gas-permeable container or forming a through hole therein. It is possible to employ, for example, a method which places a protruding object or the like, adjacent to the low gas-permeable container, and, then, pushes the protruding object, thereagainst, for causing a concentration of stresses.

With the fabrication of the gas-adsorbing device having the present structure, in cases of a gas-adsorbing member which is activated through vacuum thermal treatment, for example, it is possible to properly perform melting by heating and solidification by cooling, subsequently to the vacuum thermal treatment, which enables fabricating the gas-adsorbing device, without bringing it into contact with external air. This enables fabricating the gas-adsorbing device without performing operations in a glove box, thereby suppressing degradiations of the gas-adsorbing member during the gas-adsorbing-device fabricating processing and, also, suppressing cost increases.

Further, the sealing processing can be attained by only heating the entirety or the proximity of the sealing member, which eliminates the necessity for installing a movable portion for use in enclosing the opening portion in a glove box, thereby facilitating the sealing, thereby enabling provision of the gas-adsorbing device with lower costs.

In this case, the low gas-permeable container has a gas permeability of $10^4[cm^3/m^2*day*atm]$ or less and, more desirably, has a gas permeability of $10^3[cm^3/m^2*day*atm]$ or less.

The metal forming the low gas-permeable container is not particularly specified, and it is possible to employ, thereas, iron, copper, aluminum, for example. Further, it is also possible to employ, thereas, aluminum alloys, cupper alloys, or other alloys.

The gas-adsorbing member refers to a member which is capable of absorbing noncondensable gases in gasses. The gas-adsorbing member can be made of CuZSM-5, which is copper ion-exchanged ZSM-5 type zeolite, and, also, can be made of oxides of alkali metals or alkaline-earth metals, hydroxides of alkali metals or alkaline-earth metals, and the like. Particularly, the gas-adsorbing member can be made of lithium oxides, lithium hydroxides, barium oxides, barium hydroxides, and the like.

Further, after the gas-adsorbing device has been installed in a space containing gas to be absorbed, it is necessary to destruct the low gas-permeable container to secure ventilation therethrough, in order to enable absorption of gas outside thereof. Accordingly, it is desirable that the material of the gas-adsorbing device container has a thickness small enough to enable easily destructing it by pushing, thereagainst, a protruding object, such as a pushpin, under an atmospheric pressure, after the gas-adsorbing device container has been installed in a vacuum thermal insulation member. For example, in cases where the material thereof is aluminum, its thickness is preferably equal to or less than 1 mm, desirably equal to or less than 0.5 mm and, more desirably, equal to or less than 0.15 mm.

In this case, it is desirable that the low gas-permeable container comprises a metal. This makes the low gas-permeable container less prone to damage a vacuum apparatus, when it has been installed in the vacuum apparatus. For example, in cases where the vacuum apparatus is a vacuum thermal insulation member, its outer coating member for preventing intrusions from the outside may be formed from a plastic laminate film, in many cases. In such cases, if the outer coating member is damaged by a fragment come off the low gas-permeable container, this cause an intrusion of air into the inside of the outer coating member in the vacuum thermal insulation member, which prevents the vacuum thermal insulation member from exerting its effects. As described above, since the low gas-permeable container comprises a metal, it is possible to facilitate the application thereof to a vacuum apparatus.

Further, the sealing member may be any member which can be solidified to seal the low gas-permeable container, by being cooled, after being thermally molten. Further, the sealing member is required to pass, through the sealed portion, only an amount of gas as small as the amount of gas which can pass through the low gas-permeable container.

The sealing member is generally made of an alloy material. The sealing member is not particularly specified, and can be a copper solder, an aluminum solder, or the like. Also, as the sealing member, it is possible to employ a glass capable of exhibiting flowability at temperatures lower than the melting point of the low gas-permeable container, and such a glass can be one which is generally well known as a low melting glass for sealing.

It is desirable, in view of temperature control, that the sealing member has a melting temperature lower than the melting temperature of aluminum by 30 degrees C. or more. However, this is not desirable, in cases where it is possible to perform precise temperature control. The conditions for temperature control for cooling and solidification are not particularly specified, and natural cooling can be performed in a heating oven.

Further, in cases where the low gas-permeable container has a larger thickness and, therefore, is hard to destruct, it is also possible to perform the cooling at about 300 degrees C./h, in order to perform annealing for softening it. Further, in cases where the low gas-permeable container has a smaller thickness and, therefore, is easy to destruct, it is also possible to perform the cooling at about 10 degrees C./min, in order to improve the productivity for the gas-adsorbing device.

A cylindrical member refers to a hollow object elongated in a single direction. End portions refer to boundary portions of a cylindrical member which abut on the ambience in the direction along the longest part of the cylindrical member, and its bottom surface and upper surface correspond thereto. The maximum width of end portions refers to the length of a longest line segment, out of line segments each connecting a single point to another point in an end portion. For example, in cases where the end portions have an elliptical shape, the maximum width of the end portions refers to the length of their longer diameter. A body portion refers to the portion of a cylindrical member which forms a major part thereof and, also, refers to the portion of the cylindrical member which extends from its portion at a distance of about 5 mm from one end thereof to its portion at a distance of about 5 mm from the other end thereof. The opening portion refers to a portion of the low gas-permeable container which permits the inside of the hollow low gas-permeable container to communicate with the outside thereof without passing through the material forming the low gas-permeable container and, also, which enables charging the gas-adsorbing member therethrough.

With the aforementioned structure, it is possible to fabricate a gas-adsorbing device, as follows. Namely, the gas-adsorbing member is charged into the low gas-permeable container through the aforementioned opening portion, wherein the low gas-permeable container is constituted by a hollow cylindrical metal member which is opened at its one end and is sealed at its other end and, also, has a body portion extending from its one end to the other end thereof such that the length of the body portion is equal to or larger than the maximum width of the end portions. Thereafter, the sealing member is installed near the aforementioned opening portion, then the pressures within the low gas-permeable container and within the ambient space around the low gas-permeable container are reduced, then the proximity of the aforementioned opening portion and the aforementioned sealing member is heated, such that the aforementioned sealing member in a molten state gets to close the proximity of the aforementioned opening portion, and, thereafter, the molten sealing member closing the proximity of the aforementioned opening portion inside the aforementioned opening portion is cooled to be solidified, thereby attaining sealing of the aforementioned opening portion.

As a result thereof, the gas-adsorbing member is inhibited from being degraded during the processing for fabricating the gas-adsorbing device, which can improve the performance thereof. Further, it is possible to reduce the material cost and the number of processes which are required for the fabrication thereof, which enables provision of an inexpensive gas-adsorbing device.

Further, the method for fabricating the gas-adsorbing device according to the present embodiment is adapted, such that the low gas-permeable container is placed such that its sealed other end forms the bottom surface, then the gas-adsorbing member is charged therein through the opening portion, thereafter, a narrowed portion is formed in at least one position of the body portion closer to the opening portion than the charged gas-adsorbing member, then the sealing member is installed above the narrowed portion, and the sealing member is molten by being heated.

One of the characteristics of fabricating the gas-adsorbing device by sealing the cylindrical low gas-permeable container with the sealing member is enclosing the gas-adsorbing member in the gas-adsorbing device without performing operations within a glove box, thereby suppressing deactivation and degradations of the gas-adsorbing member due to contact thereof with gas. Therefore, in order to attain the enclosure and seating thereof without inducing intrusions of external air, it is important to secure, at proper positions, the sealing member before and after being molten.

For example, if the sealing member is molten at a state where the low gas-permeable container is laterally placed to be laterally laid, such that the direction from its opening portion toward its bottom surface is generally perpendicular to the direction of gravity, the sealing member is adhered to only the portion of the low gas-permeable container inner wall surface which contacts with the sealing member, which makes it impossible to seal the opening portion.

Further, if the low gas-permeable container is vertically installed upside down, such that its bottom surface is an upside and its opening portion is downside (the direction from the opening portion toward the bottom surface is an upward direction along the direction of gravity), the sealing member can not be secured to the proximity of the opening portion of the low gas-permeable container. Further, when the gas-adsorbing member has been charged therein before the installation of the sealing member, the sealing member comes into contact with the gas-adsorbing member from thereabove. Further, when the gas-adsorbing member is of a powder type, the sealing member may be embedded in the gas-adsorbing member.

On the other hand, if the processing for installing the sealing member is previous to the installation of the gas-adsorbing member, the sealing member will be embedded in the gas-adsorbing member, thereby making it impossible to seal the opening portion of the low gas-permeable container.

On the other hand, by installing the low gas-permeable container which has been preliminarily provided with the narrowed portion in its body portion and, also, contains the sealing member installed above the narrowed portion, such that it is vertically placed with the bottom surface being downside and the opening portion being an upside (the direction from the opening portion toward the bottom surface is a downward direction along the direction of gravity), it is possible to secure the sealing member thereto above the narrowed portion. Further, in cases where the amount of the sealing member is sufficient, when the sealing member has been molten by being heated, the sealing member is secured to the narrowed portion such that it seals the narrowed portion due to its surface tension. In the aforementioned way, it is possible to attain the sealing at a desired position without performing operations from outside the vacuum heating oven.

"The bottom surface" refers to the lower surface, namely the surface placed in the direction of gravity, out of the sealed end portion. The bottom surface may have a plane-surface shape, a semispherical shape, or the like, and, desirably, has a simple shape, in view of the strength thereof when it has been vacuum-sealed.

"The narrowed portion" refers to the portion of the low gas-permeable container which has reduced cross-sectional areas in the vertical direction and in the longitudinal direction, wherein the size and shape thereof can be determined in such a way as to prevent the sealing member from falling toward the bottom surface due to the gravity exerted on the sealing member. Accordingly, when the sealing member has a larger size, it is possible to make the narrowed portion have a larger size. When the sealing member has a smaller size, it is necessary to make the narrowed portion have a smaller size.

With the aforementioned structure, the sealing member installed in the low gas-permeable container is prevented from falling toward the bottom surface and, also, can be secured to the narrowed portion after having been molten. By doing this within the vacuum heating oven, it is possible to seal the opening portion of the low gas-permeable container without bringing it into contact with air, which suppresses degradations of the gas-adsorbing member, thereby enabling provision of a gas-adsorbing device with higher performance.

Further, the method for fabricating the gas-adsorbing device according to the present invention is adapted such that the low gas-permeable container comprises aluminum or an alloy mainly composed of aluminum, while the aforementioned sealing member comprises an alloy composed of aluminum and silicon.

Aluminum is soft and, therefore, the low gas-permeable container can be easily destructed after being installed in a vacuum apparatus, which enables provision of a gas-adsorbing device with excellent handleability. Further, the sealing member made of an alloy composed of aluminum and silicon exhibits excellent affinity for the aluminum or the aluminum alloy which forms the low gas-permeable container and, therefore, such a sealing member is suitable therefor. Further, by selecting, based on a phase diagram, an alloy composed of aluminum and silicon which has a melting point lower than the melting point of the aluminum or the aluminum alloy, it is possible to make the energy required for heating for sealing thereof lower than the energy required for melting the aluminum or the aluminum alloy for bonding them.

With the aforementioned structure, it is possible to provide a gas-adsorbing device capable of suppressing degradations of a gas-adsorbing member, during the processing for fabricating the gas-adsorbing device and during the processing for installing the gas-adsorbing device in a space containing gas to be absorbed thereby. Further, it is possible to concurrently perform heating of the gas-adsorbing member and heating of the sealing member, which can reduce the equipment-operating electric power and the number of processes which are necessary for the fabrication of the gas-adsorbing device, thereby reducing the cost for fabricating the gas-adsorbing device.

Further, the method for fabricating the gas-adsorbing device according to the present invention is adapted such that the sealing member comprises an alloy containing aluminum in an amount of at least 88.4%.

The sealing member being in a molten state (a liquid-phase state or a solid-phase/liquid-phase mixture state) is contacted with the low gas-permeable container, in the processing for installing the sealing member in the low gas-permeable container near its opening portion, then reducing the pressures within the low gas-permeable container and within the ambient space around the low gas-permeable container, then heating the proximity of the opening portion and the sealing member such that the sealing member in a molten state gets to close the proximity of the opening portion, and, thereafter, cooling and solidifying the molten sealing member closing the proximity of the opening portion inside the opening portion, thereby attaining sealing of the opening portion. However, when the sealing member in a liquid-phase state is contacted with the aluminum or the aluminum alloy which forms the low gas-permeable container, the silicon and the aluminum which are contained in the sealing member and the low gas-permeable container have a tendency to be stabilized in the entire structure (=to form a uniform composition). Due to this effect, the sealing member takes in aluminum contained in the low gas-permeable container, thus resulting in the occurrence of through holes in the low gas-permeable container. We have observed this phenomenon.

Further, it has been revealed that the higher the proportion of silicon in the sealing member, the more the sealing member is prone to induce this phenomenon. In order to prevent the formation of through holes in the low gas-permeable container, it is effective to reduce the proportion of silicon in the sealing member.

A proportion of sufficiently-reduced silicon is considered to be such that aluminum is already precipitated in a liquid composed of aluminum and silicon.

Based on a phase diagram for aluminum and silicon, such a proportion indicates a state where aluminum in the solid state exists in the liquid phase, which corresponds to a case where the proportion of aluminum is at least 88.4%.

With the aforementioned structure, even when the low gas-permeable container has a reduced thickness, it is possible to prevent the phenomenon of occurrences of through holes in the low gas-permeable container. This makes it easier to destruct the low gas-permeable container to secure ventilation therethrough, in a space containing gas to be absorbed. Accordingly, it is possible to provide a gas-adsorbing device capable of suppressing degradations of a gas-adsorbing member, during the processing for fabricating the gas-adsorbing device, and during the processing for installing the gas-adsorbing device in the space containing air to be absorbed thereby.

Further, the method for fabricating the gas-adsorbing device according to the present invention is adapted such that the low gas-permeable container comprises a metal with a thickness of 2.0 mm or less.

Since the low gas-permeable container comprises a metal with a thickness of 2.0 mm or less (preferably, 0.5 mm or less), it is possible to easily destruct the low gas-permeable container or form a through hole therein, after it has been installed in a vacuum apparatus. Namely, a metal inherently has higher strength, which makes it hard to destruct it or form a through hole therein. However, when the thickness thereof is 2.0 mm or less (preferably, 0.5 mm or less), it is possible to destruct it or form a through hole therein. This allows gas within the vacuum apparatus to easily pass through the low gas-permeable container, which enables absorption of the gas. This makes it easier to apply the gas-adsorbing device to a vacuum apparatus.

Further, since the low gas-permeable container comprises a metal, it is possible to suppress the formation of fragments which may damage the vacuum apparatus, when it is destructed. Furthermore, since the low gas-permeable container comprises a metal, it can withstand thermal treatment. Therefore, even when the gas-adsorbing member is required to be thermally treated in order to be provided with a gas absorbing property, it is possible to apply it to fabrication of a gas-adsorbing device.

Further, the method for fabricating the gas-adsorbing device according to the present invention is adapted such that the low gas-permeable container comprises copper or an alloy mainly composed of copper having a thickness of 0.5 mm or less.

Copper has a melting point of 1084 degrees C., which is higher. Therefore, even when thermal treatment at a higher temperature is necessary for providing the gas-adsorbing member with an absorbing property, the low gas-permeable container can be adapted thereto. Further, since the low gas-permeable container has a thickness of 0.5 mm or less (preferably, 0.1 mm or less), the low gas-permeable container can be easily destructed, which makes it easier to absorb gas within the vacuum apparatus. If the thickness thereof is larger than 0.5 mm, this make low gas-permeable container 7 thicker, which makes it harder to destruct it or form a through hole therein.

Further, in general, as the material of the sealing member which is mainly composed of a metal oxide or a silicon oxide, a material having a thermal expansion coefficient relatively closer to the thermal coefficient of copper can be selected, which facilitates bonding thereof.

Further, since the low gas-permeable container comprises copper, which is a metal of one type, it is possible to suppress the formation of fragments which may damage the vacuum apparatus, when it is destructed. Furthermore, since the low gas-permeable container comprises a metal, it can withstand thermal treatment. Therefore, even when the gas-adsorbing member is required to be thermally treated in order to be provided with a gas absorbing property, it is possible to apply it to fabrication of the gas-adsorbing device.

Further, the method for fabricating the gas-adsorbing device according to the present invention is adapted such that the low gas-permeable container comprises iron or an alloy mainly composed of iron having a thickness of 0.25 mm or less.

Iron has a melting point of 1535 degrees C., which is higher. Therefore, even when thermal treatment at a temperature higher than the melting point of copper is necessary for providing the gas-adsorbing member with an absorbing property, the low gas-permeable container can be adapted thereto.

Further, since iron is more inexpensive than aluminum and cupper, it is possible to provide the gas-adsorbing device with lower costs. Further, since the low gas-permeable container has a thickness of 0.25 mm or less (preferably, 0.05 mm or less), the low gas-permeable container can be easily destructed, which makes it easier to absorb gas within the vacuum apparatus. If the thickness thereof is larger than 0.25 mm, this make low gas-permeable container 7 thicker, which makes it harder to destruct it or form a through hole therein.

Further, in general, as the material of the sealing member which is mainly composed of a metal oxide or a silicon oxide, a material having a thermal expansion coefficient relatively closer to the thermal coefficient of iron can be selected, which facilitates bonding thereof.

Further, since the low gas-permeable container comprises iron, which is a metal of one type, it is possible to suppress the formation of fragments which may damage the vacuum apparatus, when it is destructed. Furthermore, since the low gas-permeable container comprises a metal, it can withstand thermal treatment. Therefore, even when the gas-adsorbing member is required to be thermally treated in order to be provided with a gas absorbing property, it is possible to apply it to fabrication of the gas-adsorbing device.

Further, the method for fabricating the gas-adsorbing device according to the present invention is adapted such that the low gas-permeable container comprises aluminum or an alloy mainly composed of aluminum having a thickness of 1.0 mm or less.

Aluminum is a particularly soft metal, out of metals which are generally used as industrial materials. Therefore, it is possible to easily form a through hole in the low gas-permeable container within a vacuum apparatus. The proportion of aluminum in the alloy which forms the low gas-permeable container is not particularly specified. However, the higher the proportion of aluminum, the more easily the low gas-permeable container can be opened. Accordingly, it is desirable to employ a so-called pure aluminum. Further, it is desirable that the proportion of aluminum is equal to or more than 99.7%, and it is more desirable that the proportion of aluminum is equal to or more than 99.85%.

In this case, aluminum has a thermal expansion coefficient of $230*10^{-7}$/degree C., while materials mainly composed of metal oxides or silicon oxides, which are generally used as sealing members, have thermal expansion coefficients of about $10*10^{-7}$/degree C. In general, it is difficult to bond such members having different thermal expansion coefficients to each other. However, the aluminum or the alloy mainly composed of aluminum has a thickness of 1.0 mm or less (preferably, 0.2 mm or less) and, therefore, can be easily deformed, due to shear stresses.

Accordingly, after performing sealing at a higher temperature, during the cooling processing, the aluminum or the alloy mainly composed of aluminum has relatively high stretcheability, which enables bonding thereof. In this viewpoint, it is desirable that the aluminum or the alloy mainly composed of aluminum which forms the low gas-permeable container has a thickness of 1.0 mm or less (preferably, 0.2 mm or less). If the thickness thereof is larger than 1.0 mm, this make low gas-permeable container 7 thicker, which makes it harder to destruct it or form a through hole therein.

As described above, aluminums or alloys mainly composed of aluminum have thermal expansion coefficients larger than those of copper and iron, and it is hard to select an aluminum or an alloy mainly composed of aluminum which has a thermal expansion coefficient equivalent to those of materials mainly composed of metal oxides or silicon oxides, which are generally employed as sealing members. However, they can be bonded to each other, since the low gas-permeable container has a thickness of 1.0 mm or less (preferably, 0.2 mm or less).

Further, since the low gas-permeable container comprises aluminum, which is a metal of one type, it is possible to suppress the formation of fragments which may damage the vacuum apparatus, when it is destructed. Furthermore, since the low gas-permeable container comprises a metal, it can withstand thermal treatment. Therefore, even when the gas-adsorbing member is required to be thermally treated in order to be provided with a gas absorbing property, it is possible to apply it to fabrication of the gas-adsorbing device.

Further, the method for fabricating the gas-adsorbing device according to the present invention is adapted such that the sealing member is mainly composed of a metal oxide or a silicon oxide.

If a sealing member made of a metal or a solder material mainly composed of a metal is heated, namely, for example, if a low gas-permeable container made of aluminum and a sealing member made of an aluminum solder are heated, this causes movements of atoms at their portions contacting with each other, in such a way as to form a thermodynamically-stabilized composition. In this case, if a bulk-type solder material mainly composed of a metal is contacted with a sheet-type metal with a thickness of 0.5 mm or less, this may induce through holes in the sheet-type metal, due to movements of only a smaller amount of atoms from the sheet-type metal. Therefore, it is not appropriate to employ a solder material mainly composed of a metal, as a sealing member for use with a sheet-type metal.

On the other hand, when the sealing member comprises an oxide, even if a sheet-type metal is contacted with the oxide being in a molten state, this causes significantly smaller movements of atoms. This is because oxygen atoms and metal atoms are coupled to each other significantly strongly and, thus, even if the oxide in a molten state comes into contact with other metal atoms, the metal atoms in the oxide are required to overcome the higher energy barrier formed by the coupling thereof with the oxygen atoms, in order to be replaced with the other metal atoms. Accordingly, in cases where the sealing member comprises an oxide, it is possible to prevent atoms from being removed from the metal with a thickness of 0.5 mm or less, which prevents occurrences of through holes therein.

As described above, with the present structure, it is possible to concurrently satisfy characteristics inconsistent with each other, which are necessary for the gas-adsorbing device. That is, since the low gas-permeable container has a thickness of 0.5 mm or less, it is possible to easily destruct the low gas-permeable container or form a through hole therein, in order to absorb ambient gasses, after it has been installed in a vacuum apparatus. Along therewith, since the sealing member is mainly composed of a metal oxide or a silicon oxide, even when the low gas-permeable container has a thickness of 0.5 mm or less, it is possible to prevent formation of through holes therein due to the contact thereof with the sealing member. As a structure capable of satisfying these characteristics concurrently, the low gas-permeable container made of a metal is sealed with a member mainly composed of a metal oxide or a silicon oxide.

Further, the method for fabricating the gas-adsorbing device according to the present invention is adapted such that the sealing member is made of a glass. In this case, "glass" refers to an amorphous solid material which is mainly composed of a silicate, exhibits excellent rigidity at room temperatures, further degrades its rigidity with rising temperature and, also, has a glass transition temperature.

The type of this glass is not particularly specified, but this glass is desirably one being capable of exhibiting flowability at temperatures sufficiently lower than the melting point of the low gas-permeable container and, also, having a thermal expansion coefficient closer to that of the material forming the low gas-permeable container.

A glass is mainly composed of a metal oxide or a silicon oxide. Therefore, even if the sealing member made of a bulk-type glass is brought into contact with the low gas-permeable container made of a sheet-type metal or a sheet-type alloy mainly composed of a metal, the metal atoms constituting the low gas-permeable container are hardly removed therefrom. As a result thereof, no through hole is formed in the low gas-permeable container, thereby enabling sealing thereof.

Further, glasses have been generally employed as sealing members for use in electronic apparatuses and, therefore, it is possible to provide the gas-adsorbing device with a relatively lower cost.

Further, the gas-adsorbing device according to the present invention has a structure fabricated according to any of the aforementioned gas-adsorbing-device fabricating methods. The gas-adsorbing member is inhibited from being degraded during the fabricating processing and, therefore, exhibits an excellent gas absorbing property. Furthermore, in cases of employing a gas-adsorbing member required to be thermally treated for activation thereof, it is possible to perform this thermal treatment and enclosure of the gas-adsorbing member in the low gas-permeable container through the same processing, thereby providing the advantage of reduced costs.

With the fabrication according to the method according to the present invention, it is possible to perform, in a vacuum space, all of processing for fabricating the gas-adsorbing device, processing for providing the gas-adsorbing member with an absorbing property, and operations for enclosing and sealing the gas-adsorbing member in the low gas-permeable container. This significantly inhibits the gas-adsorbing member having been provided with the absorbing property from contacting with air, which enables provision of a gas-adsorbing device including the gas-adsorbing member with significantly reduced degradations.

Further, the sealing processing is performed using only the sealing member, without using a sealing plate or other members, which eliminates the necessity of costs required for such a sealing plate. Further, there is no need for installing a movable portion for use in performing operations for enclosing the low gas-permeable container in a vacuum oven, which makes the sealing processing easier, thereby reducing the cost required for fabricating the gas-adsorbing device.

Further, according to the method for fabricating the gas-adsorbing device having the present structure, in cases where there is a need for thermal treatment processing for providing the gas-adsorbing member with an absorbing property, it is possible to concurrently perform heating of the gas-adsorbing member and heating of the sealing member. Namely, the sealing processing can be performed subsequently to the thermal treatment processing, which eliminates the necessity of energy for a temperature rise to the temperature for the thermal treatment processing, out of the energy for a temperature rise to the temperature for the sealing processing. This can reduce the equipment-operating electric power and the number of processes which are necessary for the fabrication of the gas-adsorbing device, which enables provision of an inexpensive gas-adsorbing device.

Further, a gas-adsorbing-device using method according to the present invention is adapted such that at least one of the sealing member and the boundary surface between the low gas-permeable container and the sealing member is destructed, in order to absorb ambient gas.

When the gas-adsorbing device has been installed in a vacuum apparatus, it is necessary to destruct the low gas-permeable container or form a through hole therein, in order to absorb gas. To cope therewith, it is possible to employ, for example, a method which places a protruding object, adjacent to the gas-adsorbing device, and further, pushes the protruding object thereagainst for forming a through hole therein, after it has been installed in a vacuum apparatus, such as a vacuum thermal insulation member.

On the other hand, with the present structure, utilizing the fact that an oxide is prone to brittle fracture by being subjected to stresses, it is possible to apply stresses to the portion of the low gas-permeable container which is sealed with the sealing member, for destructing at least one of the sealing member and the boundary surface between the low gas-permeable container and the sealing member, thereby enabling the gas-adsorbing device to absorb air. This eliminates the necessity of a protruding object and the like for destructing the low gas-permeable container, thereby reducing the cost for applying the gas-adsorbing device to a vacuum apparatus.

As described above, the gas-adsorbing-device fabricating method according to the present invention is adapted to include charging the gas-adsorbing member in the low gas-permeable container through its opening portion, wherein the low gas-permeable container is constituted by a hollow cylindrical metal member which is opened at its one end and is sealed at its other end and, also, has a body portion extending from its one end to the other end thereof such that the length of the body portion is equal to or larger than the maximum width of the end portions. Thereafter, this fabricating method includes installing the sealing member within the opening portion and near the opening portion, then reducing the pressures within the low gas-permeable container and within the ambient space around the low gas-permeable container, then heating the proximity of the opening portion and the sealing member such that the sealing member in a molten state gets to close the proximity of the opening portion, and, thereafter, cooling and solidifying the molten sealing member closing the proximity of the opening portion inside the opening portion, thereby attaining sealing of the opening portion.

With the aforementioned structure, it is possible to provide a gas-adsorbing device capable of suppressing degradations of the gas-adsorbing member, during the processing for fabricating the gas-adsorbing device, and during the processing for installing the gas-adsorbing device in a space containing a gas to be absorbed thereby. Further, the sealing processing is performed using only the sealing member without using a sealing plate or other members, which facilitates the sealing processing, thereby reducing the cost for fabricating the gas-adsorbing device. Further, in cases where there is a need for thermal treatment processing for providing the gas-adsorbing member with an absorbing property, it is possible to concurrently perform heating of the gas-adsorbing member and heating of the sealing member, which can reduce the equipment-operating electric power and the number of processes which are necessary for the fabrication of the gas-adsorbing device, which can reduce the cost for fabricating the gas-adsorbing device.

INDUSTRIAL APPLICABILITY

With the gas-adsorbing-device fabricating method, the gas-adsorbing device and the gas-adsorbing-device using method according to the present invention, it is possible to fabricate a gas-adsorbing device capable of suppressing degradations of a gas-adsorbing member which loses its absorbing property by contacting with air during the fabricating processing, without installing a movable portion within vacuum heating oven, thereby enabling provision of the gas-adsorbing device with lower costs. Further, the gas-adsorbing-device fabricating method, the gas-adsorbing device and the gas-adsorbing-device using method according to the present invention can be used for thermal treatment and sealing of agents and the like which are required to be thermally treated and, also, may be degraded by contacting with air after the thermal treatment. Therefore, particularly, the gas-adsorbing-device fabricating method, the gas-adsorbing device and the gas-adsorbing-device using method according to the present invention are applicable to apparatuses capable of exerting their performance in high-vacuum environments, such as vacuum thermal insulation members, vacuum thermal insulation containers, plasma displays.

REFERENCE MARKS IN THE DRAWINGS

5 Sealing member
7 Low gas-permeable container
8 Opening portion
9 Body portion 10 Bottom surface
11 Narrowed portion
12 Vacuum thermal insulation member
13 Outer coating member
14 Core member
15 Cutout portion
16 Gas-adsorbing member

The invention claimed is:

1. A gas-adsorbing device comprising:
   a cylindrical metal container comprising an activated gas-adsorbing member in an interior of the container, the interior of the container being depressurized, the container having an opening portion on a first end and a sealed end portion on a second end; and
   a sealing member that seals the opening portion,
   wherein the container is provided with a narrow portion at a position closer to the opening portion than the gas-adsorbing member, the narrow portion forming a gap having a predetermined width inside the container,
   wherein the sealing member seals the gap,
   wherein the material of the sealing member is mainly composed of a material selected from the group consisting of a metal oxide, a silicon oxide and an aluminum solder,
   wherein when the material of the sealing member is the metal oxide or the silicon oxide, a softening point of the sealing member is lower than a melting point of a metal of the container and higher than an activating temperature of the gas-adsorbing member, and
   wherein when the material of the sealing member is the aluminum solder, a melting point of the sealing member is lower than a melting point of a metal of the container and higher than an activating temperature of the gas-adsorbing member.

2. The gas-adsorbing device according to claim 1, wherein the narrow portion is formed within a distance of 5 mm from the opening portion.

3. The gas-adsorbing device according to claim 1, wherein the gap is linear.

4. The gas-adsorbing device according to claim 1, wherein the opening portion is provided with cutouts at positions opposing to each other in a longitudinal direction of the narrow portion.

5. The gas-adsorbing device according to claim 1, wherein the container is made of a metal with a thickness of 2.0 mm or less.

6. The gas-adsorbing device according to claim 1, wherein the container is made of copper or an alloy mainly composed of copper having a thickness of 0.5 mm or less.

7. The gas-adsorbing device according to claim 1, wherein the container is made of iron or an alloy mainly composed of iron having a thickness of 0.25 mm or less.

8. The gas-adsorbing device according to claim 1, wherein a width of the opening portion is wider than the predetermined width of the narrow portion.

9. The gas-adsorbing device according to claim 1, wherein the sealing member has a cylindrical shape.

10. The gas-adsorbing device according to claim 1, wherein the sealing member has a diameter of 1.5-2 mm and a length of 10-25 mm.

11. A gas-adsorbing device comprising:
    a cylindrical metal container comprising an activated gas-adsorbing member in an interior of the container, the interior of the container is depressurized, the container having an opening portion on a first end and a sealed end portion on a second end; and
    a sealing member that seals the opening portion,
    wherein the container is provided with a narrow portion at a position closer to the opening portion than the gas-adsorbing member, the narrow portion forming a gap having a predetermined width inside the container,
    wherein the sealing member seals the gap, and
    wherein the opening portion is provided with cutouts at positions opposing each other in the longitudinal direction of the narrow portion.

12. A gas-adsorbing device comprising:
    a cylindrical metal container comprising an activated gas-adsorbing member in an interior of the container, the interior of the container is depressurized, the container having an opening portion on a first end and a sealed end portion on a second end; and
    a sealing member that seals the opening portion,
    wherein the container is provided with a narrow portion at a position closer to the opening portion than the gas-adsorbing member, the narrow portion forming a gap having a predetermined width inside the container,
    wherein the sealing member seals the gap, and
    wherein the sealing member is made of a glass having a softening point lower than a melting point of a metal of the container and higher than an activating temperature of the gas-adsorbing member.

* * * * *